US011163549B2

(12) United States Patent
Sakurai et al.

(10) Patent No.: US 11,163,549 B2
(45) Date of Patent: *Nov. 2, 2021

(54) VEHICLE INFORMATION COMMUNICATION SYSTEM

(71) Applicant: DENSO CORPORATION, Kariya (JP)

(72) Inventors: Nao Sakurai, Kariya (JP); Shuhei Takahashi, Kariya (JP); Kazuaki Hayakawa, Kariya (JP); Takuya Hasegawa, Kariya (JP); Yuzo Harata, Kariya (JP); Kazuhiro Uehara, Kariya (JP); Takuya Kawasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

This patent is subject to a terminal disclaimer.

(21) Appl. No.: 16/792,917

(22) Filed: Feb. 18, 2020

(65) Prior Publication Data
US 2020/0183676 A1 Jun. 11, 2020

Related U.S. Application Data

(63) Continuation-in-part of application No. 16/535,187, filed on Aug. 8, 2019, now Pat. No. 10,592,231.

(30) Foreign Application Priority Data

Aug. 10, 2018 (JP) .............................. JP2018-151414
Jul. 12, 2019 (JP) .............................. JP2019-129951

(51) Int. Cl.
*G06F 8/65* (2018.01)
*H04L 9/32* (2006.01)
(Continued)

(52) U.S. Cl.
CPC .............. *G06F 8/65* (2013.01); *H04L 9/3239* (2013.01); *H04L 12/40* (2013.01); *H04L 67/34* (2013.01);
(Continued)

(58) Field of Classification Search
None
See application file for complete search history.

(56) References Cited

U.S. PATENT DOCUMENTS 10,592,231 B2  3/2020  Sakurai et al.
10,678,454 B2  6/2020  Sakurai et al.
(Continued)

FOREIGN PATENT DOCUMENTS

JP  2004348767 A  12/2004
JP  2014-182571 A  9/2014
(Continued)

OTHER PUBLICATIONS

U.S. Appl. No. 17/153,341, filed Jan. 20, 2021, Harata, Yuzo.
(Continued)

*Primary Examiner* — Qing Chen
(74) *Attorney, Agent, or Firm* — Harness, Dickey & Pierce, P.L.C.

(57) ABSTRACT

A vehicle information communication system includes a center apparatus and a vehicle apparatus that includes a group of electronic control units (ECUs) and that sends vehicle configuration information including configuration information on the group of ECUs mounted in the vehicle to the center apparatus via wireless communications. The center apparatus performs a first determination of whether the vehicle configuration information received from the vehicle apparatus matches approved-configuration information registered in an approved-configuration database, and performs a second determination of whether software update data for at least one ECU of the group of ECUs mounted in the vehicle exists in an update database. When both the first and second determinations are true, the center apparatus sends the software update data for at least one ECU of the group
(Continued)

of ECUs mounted in the vehicle to the vehicle apparatus via the wireless communications.

22 Claims, 28 Drawing Sheets

(51) Int. Cl.
*H04L 29/08* (2006.01)
*H04L 12/40* (2006.01)

(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 2001/0002814 | A1 | 6/2001 | Suganuma et al. |
| 2004/0266533 | A1 | 12/2004 | Gentles et al. |
| 2009/0125985 | A1 | 5/2009 | Traenkenschuh et al. |
| 2009/0126028 | A1 | 5/2009 | Traenkenschuh et al. |
| 2010/0228404 | A1 | 9/2010 | Link, II et al. |
| 2014/0067231 | A1 | 3/2014 | Mosher et al. |
| 2014/0114497 | A1 | 4/2014 | Miyake |
| 2015/0113520 | A1 | 4/2015 | Kotani et al. |
| 2016/0099806 | A1 | 4/2016 | Racklyeft et al. |
| 2016/0170775 | A1 | 6/2016 | Rockwell et al. |
| 2016/0173530 | A1 | 6/2016 | Miyake |
| 2017/0060559 | A1 | 3/2017 | Ye et al. |
| 2017/0262277 | A1 | 9/2017 | Endo et al. |
| 2018/0018160 | A1 | 1/2018 | Teraoka et al. |
| 2018/0152341 | A1 | 5/2018 | Maeda et al. |
| 2019/0265966 | A1 | 8/2019 | Shimomura |
| 2020/0241771 | A1 | 7/2020 | Sakurai et al. |

FOREIGN PATENT DOCUMENTS

| | | |
|---|---|---|
| JP | 2015-079440 A | 4/2015 |
| JP | 2017-097620 A | 6/2017 |
| JP | 2017157004 A | 9/2017 |
| JP | 201872920 A | 5/2018 |
| JP | 2018-125039 A | 8/2018 |
| JP | 2018-132979 A | 8/2018 |

OTHER PUBLICATIONS

U.S. Appl. No. 17/166,453, filed Feb. 3, 2021, Sakurai, Nao.
U.S. Appl. No. 17/166,498, filed Feb. 3, 2021, Ogawa, Tomoya.
U.S. Appl. No. 17/166,610, filed Feb. 3, 2021, Sakurai, Nao.
U.S. Appl. No. 17/166,729, filed Feb. 3, 2021, Ogawa, Tomoya.
U.S. Appl. No. 17/166,840, filed Feb. 3, 2021, Harata, Yuzo.
U.S. Appl. No. 17/166,891, filed Feb. 3, 2021, Sakurai, Nao.
U.S. Appl. No. 17/167,342, filed Feb. 4, 2021, Sakurai, Nao.
U.S. Appl. No. 17/167,373, filed Feb. 4, 2021, Harata, Yuzo.
U.S. Appl. No. 17/167,443, filed Feb. 4, 2021, Harata, Yuzo.
U.S. Appl. No. 17/167,547, filed Feb. 4, 2021, Harata, Yuzo.
U.S. Appl. No. 17/167,580, filed Feb. 4, 2021, Harata, Yuzo.
U.S. Appl. No. 17/167,668, filed Feb. 4, 2021, Harata, Yuzo.
U.S. Appl. No. 17/167,702, filed Feb. 4, 2021, Harata, Yuzo.
U.S. Appl. No. 17/167,747, filed Feb. 4, 2021, Harata, Yuzo.
U.S. Appl. No. 17/167,836, filed Feb. 4, 2021, Harata, Yuzo.
U.S. Appl. No. 17/168,653, filed Feb. 5, 2021, Sakurai, Nao.
U.S. Appl. No. 17/168,738, filed Feb. 5, 2021, Abe, Taiji.
U.S. Appl. No. 17/168,812, filed Feb. 5, 2021, Harata, Yuzo.
U.S. Appl. No. 17/168,969, filed Feb. 5, 2021, Harata, Yuzo.
U.S. Appl. No. 17/169,026, filed Feb. 5, 2021, Harata, Yuzo.
U.S. Appl. No. 17/169,075, filed Feb. 5, 2021, Harata, Yuzo.
U.S. Appl. No. 17/169,932, filed Feb. 8, 2021, Harata, Yuzo.
U.S. Appl. No. 17/170,104, filed Feb. 8, 2021, Harata, Yuzo.
U.S. Appl. No. 17/170,155, filed Feb. 8, 2021, Harata, Yuzo.
U.S. Appl. No. 17/170,193, filed Feb. 8, 2021, Harata, Yuzo.
U.S. Appl. No. 17/170,222, filed Feb. 8, 2021, Harata, Yuzo.
U.S. Appl. No. 17/170,251, filed Feb. 8, 2021, Harata, Yuzo.
U.S. Appl. No. 17/170,306, filed Feb. 8, 2021, Harata, Yuzo.
"Draft proposal to introduce a regulation on software update processes," TF-CS/OTA, dated Apr. 24, 2018.
"Draft Recommendation on Software Updates of the Task Force on Cyber Security and Over-the-air issues of UNECE WP.29 IWG ITS/AD," TF-CS/OTA, dated Apr. 23, 2018.
U.S. Appl. No. 16/535,187, filed Aug. 8, 2019, Nao Sakurai.

FIG. 10

| ECU SWID | OLD PROGRAM | NEW PROGRAM | VERIF DATA FOR OLD PROGRAM | VERIF DATA FOR NEW PROGRAM | UPDATE DATA | VERIF DATA FOR UPDATE DATA | ROLLBACK DATA | VERIF DATA FOR ROLLBACK DATA |
|---|---|---|---|---|---|---|---|---|
| ads_002 | adsfile001 | adsfile002 | w1 | z1 | adsfile001-002 | x1 | adsfile002-001 | y1 |
| brk_005 | brkfile001 | brkfile005 | w2 | z2 | brkfile001-005 | x2 | brkfile005-001 | y2 |
| eps_011 | epsfile010 | epsfile011 | w3 | z3 | epsfile010-011 | x3 | epsfile011-010 | y3 |

204 ECU REPROG DATA DB

FIG. 17

SPEC DATA

| ITEM | | ILLUSTRATED VALUE |
|---|---|---|
| REWRITE ENV | VEH STATE | IG ON / IG OFF ONLY |
| | BATTERY LEVEL | 40% OR MORE |
| | BUS LOAD TABLE | SEE FIG. 18 |
| GROUP INFO | 1ST GROUP INFO | ECU_ID1→ECU_ID2→ECU_ID3 |
| | 2ND GROUP INFO | ECU_ID4→ECU_ID5→ECU_ID6 |
| ECU IDn INFO, n=1 to 6 | ECU ID | ECU ID |
| | BUS | 1st BUS |
| | POWER | +B, ACC, IG |
| | MEM TYPE | SINGLE / PSEUDO TWO / TWO |
| | REWRITE AREA INFO | A-AREA IN-USE, B-AREA REWRITE |
| | ACCESS KEY INFO | RANDOM NUM |
| | | KEY PATTERN |
| | | DECRYPT CALC PATTERN |
| | REWRITE METHOD | SELF POWER / POWER CTRL |
| | TRANSFER SIZE | 1Kbyte |
| | UPDATE DATA VERSION | 2.0 |
| | UPDATE DATA ACQ ADDRESS | 1 |
| | UPDATE DATA SIZE | 10Mbyte |
| | ROLLBAKC DATA VERSION | 1.0 |
| | ROLLBAKC DATA ACQ ADDRESS | 0x80000 |
| | ROLLBAKC DATA SIZE | 10Mbyte |
| | WRITING DATA TYPE | DIFF DATA / WHOLE DATA |
| | WRITE AREA | FOR B-AREA |

FIG. 18

BUS LOAD TABLE

|  |  | 1st BUS | 2nd BUS | 3rd BUS |
|---|---|---|---|---|
| ALLOWABLE TRANSFER LEVEL | | 80% | 70% | 90% |
| IG STATE | VEH CTRL DATA | 50% | 20% | 40% |
| | WRITE DATA | 30% | 50% | 50% |
| ACC STATE | VEH CTRL DATA | 30% | 30% | 20% |
| | WRITE DATA | 50% | 40% | 70% |
| +B STATE | VEH CTRL DATA | 20% | 10% | 50% |
| | WRITE DATA | 60% | 60% | 40% |

VEHICLE INFORMATION COMMUNICATION SYSTEM

CROSS REFERENCE TO RELATED APPLICATIONS

This application is a continuation-in-part application of U.S. patent application Ser. No. 16/535,187 (now U.S. Pat. No. 10,592,231) filed on Aug. 8, 2019, which claims the benefit of priority from Japanese Patent Applications No. 2018-151414 filed on Aug. 10, 2018 and No. 2019-129951 filed on Jul. 12, 2019. The entire disclosures of all of the above applications are incorporated herein by reference.

TECHNICAL FIELD

The present disclosure relates to a vehicle information communication system.

BACKGROUND

In recent years, vehicle control is in development in a variety of aspects including driving support functions and autonomous driving functions. Accordingly, the scale of application programs such as vehicle control programs and diagnosis programs installed in electronic control units (also referred to as ECUs) of the vehicle is increasing. Because of version upgrades for function improvement etc., the opportunity to rewrite (reprogram) the application programs on the ECUs is also increasing.

With the development of communication networks etc., a connected-car technology is also in development. Under such circumstances, a technology for a center to distribute ECU update programs to vehicle apparatuses over-the-air (OTA) and for the vehicles to write the update programs is desired.

SUMMARY

In an aspect of the present disclosure, a vehicle information communication system comprises a center apparatus and a vehicle apparatus. The vehicle apparatus is mounted in a vehicle and includes a group of electronic control units (ECUs) and a vehicle computer. The center apparatus includes an approved-configuration database (DB) that includes approved-configuration information for the group of ECUs mounted in the vehicle, an update DB that contains software update data for the group of ECUs mounted in the vehicle, and a center computer configured to communicate with the vehicle apparatus via wireless communications. The vehicle computer is configured to send vehicle configuration information which includes configuration information on the group of ECUs mounted in the vehicle to the center apparatus via the wireless communications. The center computer is configured to: perform a first determination of whether the vehicle configuration information received from the vehicle apparatus matches the approved-configuration information registered in the approved-configuration DB; perform a second determination of whether software update data for at least one ECU of the group of ECUs mounted in the vehicle exists in the update DB: and when both the first and second determinations are true, send the software update data for at least one ECU of the group of ECUs mounted in the vehicle to the vehicle apparatus via the wireless communications.

BRIEF DESCRIPTION OF THE DRAWINGS

Objects, features and advantages of the present disclosure will become more apparent form the following detailed description made with reference to the accompanying drawings. In the drawings:

FIG. 10 is a diagram illustrating programs and data registered in an ECU reprogramming data DB;

FIG. 17 is a diagram illustrating specification data;

FIG. 18 is a diagram illustrating a bus load table;

DETAILED DESCRIPTION

Embodiments will be described with reference to the drawings. First; an outline of a vehicle program rewriting system 1 also called a vehicle information communication system will be described with reference to FIGS. 1 to 20.

Figure 1:
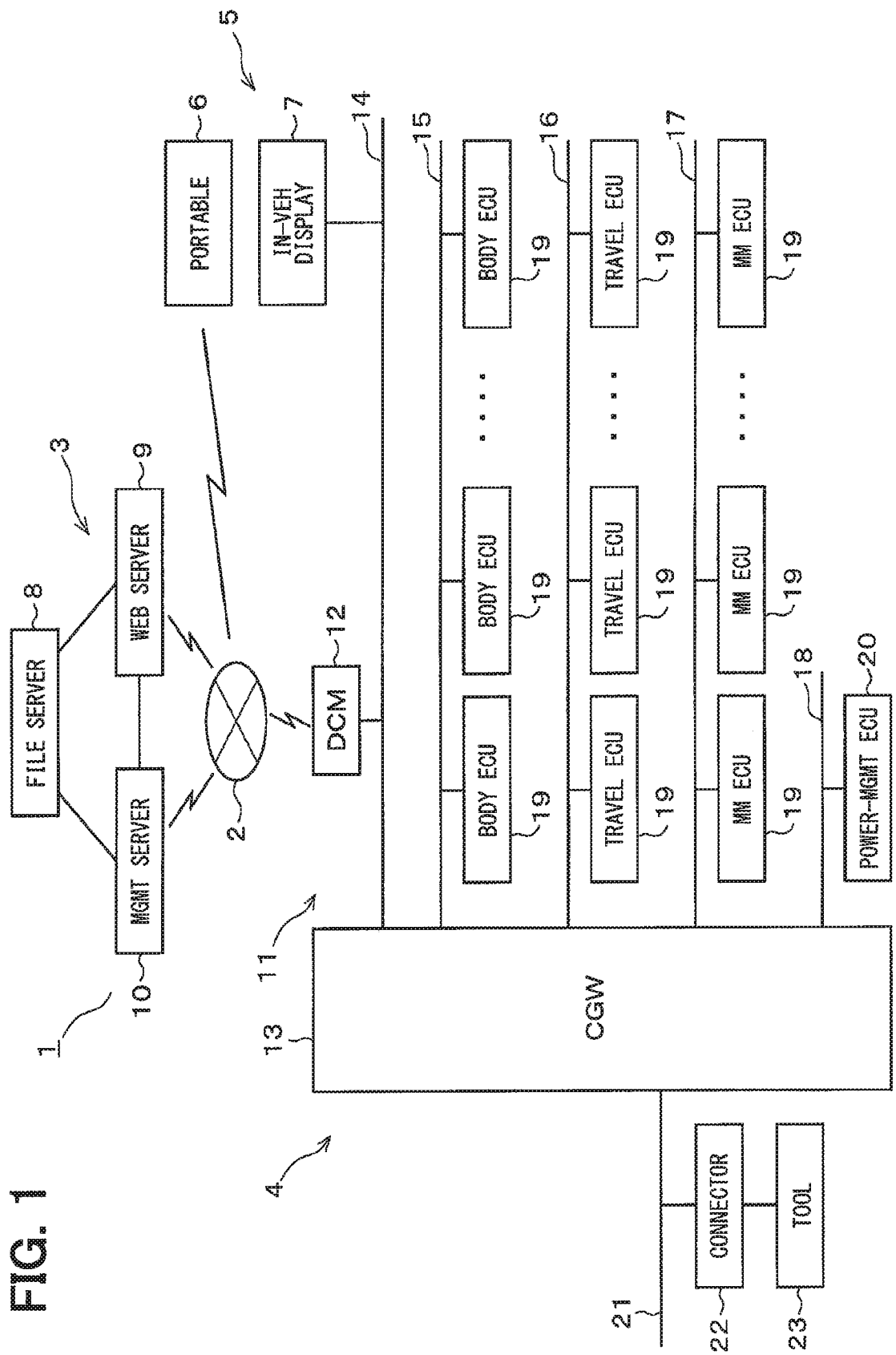
FIG. 1 is a diagram illustrating a vehicle information communication system.

In some embodiments, the vehicle program rewriting system 1 acts as a system for providing and rewriting software of ECUs in a vehicle over-the-air (OTA). The software may be application programs such as control programs and diagnosis programs, firmware programs; control data, or any other data used by the ECUs. As shown in FIG. 1, the vehicle program rewriting system 1 includes a communication network 2, a center apparatus 3, a vehicle system 4, and a display terminal 5.

The communication network 2 includes, for example, a mobile communication network such as 4G communications network, the Internet, WiFi (Wireless Fidelity) (registered trademark), and the like. That is, the communication network 2 includes a wireless communications network.

The display terminal 5 has a function of displaying various screens and a function of receiving a user's operation. For example, the display terminal 5 may include a portable terminal 6 portable by a user and an in-vehicle display 7 arranged in a vehicle cabin. The portable terminal 6 may be a smartphone, a icy tablet or the like. The in-vehicle display 7 may be a display used for navigation function also, or may be a meter display. The portable terminal 6 is connectable to the communication network 2 when the portable terminal 6 is within a communication range of the mobile communication network. The in-vehicle display 7 is connected to the vehicle system 4.

When the user is outside the vehicle and is in the communication range of the mobile communication network, the user can perform, with the portable terminal 6, input operations while checking various screens involved in the rewriting of an application program of the vehicle, and can perform a procedure involved in the rewriting of the application program of the vehicle. If the user is in the vehicle, the user can perform, with the in-vehicle display 7, input operations while confirming various screens involved in the rewriting of the application program of the vehicle and can perform a procedure involved in the rewriting of the application program of the vehicle. Thus, depending on whether the user is inside or outside the vehicle, the user can selectively use the portable terminal 6 or the in-vehicle display 7 to perform the procedure involved in rewriting of the application program.

In the vehicle program rewriting system 1, the center apparatus 3 controls OTA functions remotely from the vehicle (on the communication network side) and acts as an OTA center. The center apparatus 3 may include a file server 8, a web server 9, and a management server 10. The servers 8 to 10 can perform data communications with each other. These severs 8 to 10 may be implemented by a single computer or discrete computers.

The file server 8 has a function of managing application programs, which are sent from the center apparatus 3 to the vehicle system 4. Specifically, the file server 8 manages an ECU program provided by a supplier or the like (e.g., provider of the application program), information accompanying the ECU program, distribution specification data provided by an OEM (Original Equipment Manufacturer), and vehicle states acquired from the vehicle systems 4, The file server 8 can perform data communication with the vehicle system 4 via the communication network 2. Upon generation of a distribution package download request, the file server 8 sends to the vehicle system 4 a distribution package in which reprograming data and distribution specification data are packaged.

The web server 9 manages web information and provides the portable terminal 6 with various screens involved in application program rewriting.

The management server 10 manages information on registered-users of application program rewriting service, which information may include personal information. The management server 10 manages an application program rewriting history and the like in association with each individual vehicle.

The vehicle system 4 includes a master device 11. The vehicle system 4 corresponds to a vehicle apparatus. The master device 11 corresponds to a vehicle computer. The master device 11 includes a data communication module (DCM) 12 and a central gateway (CGW) 13. The DCM 12 and the CGW 13 are communicably connected via a first bus 14.

The DCM 12 includes an on-vehicle communicator that performs data communication with the center apparatus 3 via the communication network 2. That is, the DCM 12 is communicable with the center apparatus 3 via wireless communications. When a distribution package is downloaded from the file server 8, the DCM 12 extracts writing data from the distribution package and transfers it to the CGW 13.

The CGW 13 includes a vehicle gateway device having a data relay function. When the CGW 13 acquires the writing data from the DCM 12, the CGW 13 distributes the writing data to rewrite target ECU(s) storing thereon the application program to be rewritten. In the vehicle program rewriting system 1, the master device 11 controls the functions of the OTA on the vehicle and functions as an OTA master. Although the DCM 12 and the in-vehicle display 7 are connected to the first bus 14 in FIG. 1, the DCM 12 and the in-vehicle display 7 may be connected to different buses.

The second bus 15, the third bus 16, the fourth bus 17, and the fifth bus 18 are connected to the CGW 13 in addition to the first bus 14. The first to fifth buses 14 to 18 are buses for an inside of the vehicle. Various ECUs 19 are connected to the CGW 13 via the buses 15 to 17. A power management ECU 20 is connected to the CGW 13 via the bus 18.

The second bus 15 is, for example, a bus for a body system network. The ECUs 19 connected to the second bus 15, which also referred to as body ECUs, include a door ECU which controls locking and unlocking of a door, a meter ECU which controls meter display, an air conditioner ECU which controls an air conditioner, and a window ECU which controls opening and closing of a window. These ECUs control a body system.

The third bus 16 is, for example, a bus for a travel system network. The ECUs 19 connected to the third bus 16, which are also referred to travel ECUs, include an engine ECU which controls an engine, a brake ECU which controls a brake, and a transmission ECU which controls an automatic transmission, and a power steering ECU which controls a power steering. These ECUs control a travel system.

The fourth bus 17 is, for example, a bus for a multimedia network. The ECUs 19 connected to the fourth bus 17, which are also referred to multimedia (MM) ECU, include an navigation ECU which control a navigation system, and an electronic toll collection (ETC) ECU which controls an ETC function. These ECUs 19 control a multimedia system. One or more of the buses 15 to 17 may be buses other than those for the body system network, the travel system network and the multimedia system network. Further, the number of buses and the number of ECUs 19 are not limited to those illustrated above.

The power supply ECU 20 has a function of performing power supply management of the DCM 12, the CGW 13, the ECUs 19, and the like.

The sixth bus 21 for an external tool is connected to the CGW 13. A data link coupler (DLC) connector 22 to which a tool 23 is detachably connectable is connected to the sixth bus 21. The buses 14 to 18 for the inside of the vehicle and the bus 21 for the external tool are, for example, CAN (Controller Area Network (registered trademark)) buses. In accordance with the CAN data communication standard and diagnostic communication standard (UDS: ISO 14229), the CGW 13 performs data communication with the DCM 12, the various ECUs 19, and the tool 23. The DCM 12 and the CGW 13 may be connected by Ethernet. The DLC connector 22 and the CGW 13 may be connected by Ethernet.

When the rewrite target ECU 19 receives the writing data from the CGW 13, the rewrite target ECU 19 writes the writing data to the flash memory thereof to rewrite the application program. In some embodiments, the CGW 13 functions as a reprogramming master that distributes the writing data to the rewrite target ECU 19 upon receipt of a writing data acquisition request from the rewrite target ECU 19. When the rewrite target ECU 19 receives the writing data from the CGW 13, the rewrite target ECU 19 functions as a reprogram slave that writes the writing data to the flash memory to rewrite the application program.

Rewriting an application program includes wired-communications-based rewriting and wireless communications-based rewriting. In the case of wired-communications-based rewriting, the tool 23 is connected to the DLC connector 22 and the tool 23 transfers the writing data to the CGW 13. The CGW 13 relays or distributes the writing data to the rewrite target ECU 19. In the case of wireless communications-based rewriting, the DCM 12 downloads the distribution package from the file server 8 and extracts the writing data from the distribution package and transfers the writing data to the CGW 13.

Figure 2:
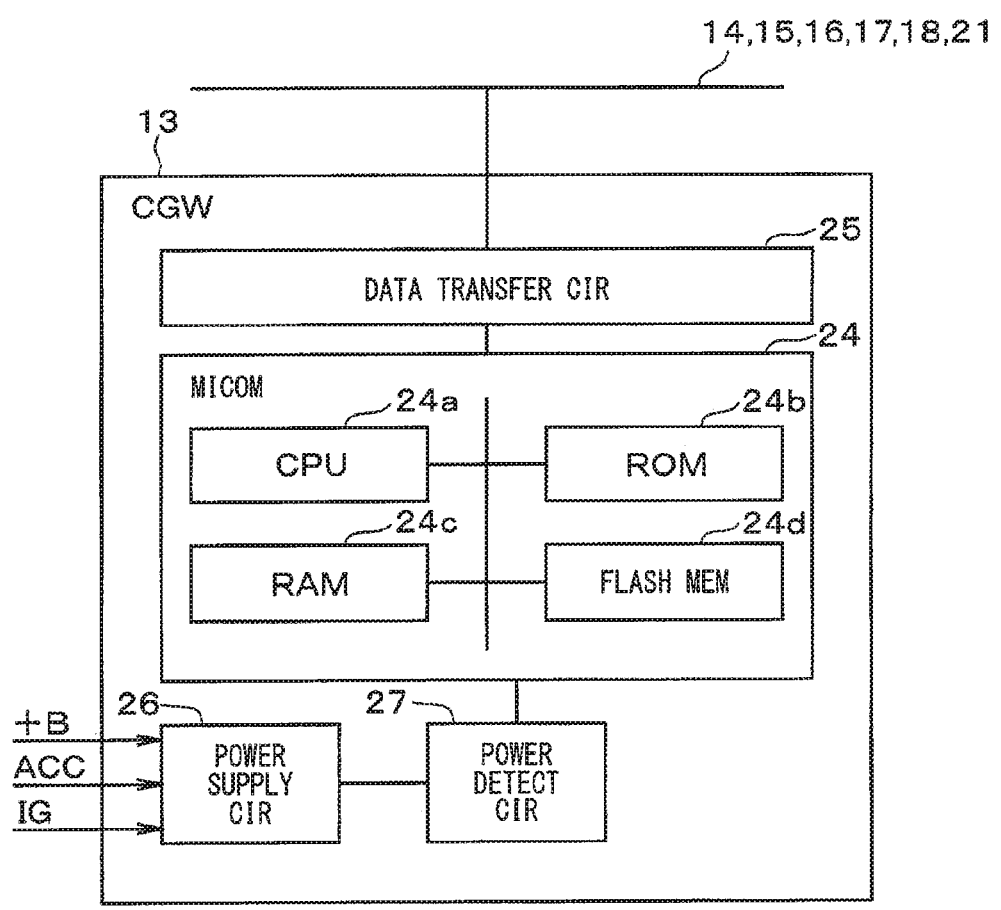
FIG. 2 is a diagram illustrating a central gateway (CGW)

As shown in FIG. 2, the CGW 13 includes a microcomputer (MICOM) 24, a data transfer circuit 25, a power supply circuit 26, and a power detection circuit 27. The microcomputer 24 includes a central processing unit (CPU) 24a, a read only memory (ROM) 24b, a random access memory (RAM) 24c, and a flash memory 24d. The microcomputer 24 executes various control programs stored in a non-transitory tangible storage medium (e.g., ROM) to perform various processes, thereby controlling operations of the CGW 13.

In the CGW 13, the microcomputer 24 executing the programs may provide the CGW 13 with its various functions. Dedicated circuits such as application-specific integrated circuit (ASIC) and field-programmable gate array (FPGA) may provide the CGW 13 with its various functions. Alternatively, the dedicated circuit and the microcomputer 24 executing programs, in combination, may provide the CGW 13 with its various functions. In addition, various functions provided by the CGW 13 are not limited to those provided by a single electronic control unit. A distributed system including a plurality of discrete electronic control units may implement various functions of the CGW 13.

The data transfer circuit 25 controls data communication with the buses 14 to 18 and 21 in accordance with the CAN data communication standards and the diagnostic communication standards. The power supply circuit 26 can receive inputs of a battery power (also referred to as +B power), an accessory power (also referred to as an ACC power), and an ignition power (also referred to as an IG powery). The power detection circuit 27 detects the voltage value of the +B power, the voltage value of the ACC power, and the voltage value of the IG power input to the power supply circuit 26, compares the detected voltage value with a predetermined voltage threshold, and outputs comparison results to the microcomputer 24. The microcomputer 24 determines whether the +B power, the ACC power, and the IG power supplied to the CGW 13 are normal or abnormal based on the comparison results input from the power detection circuit 27.

Figure 3:
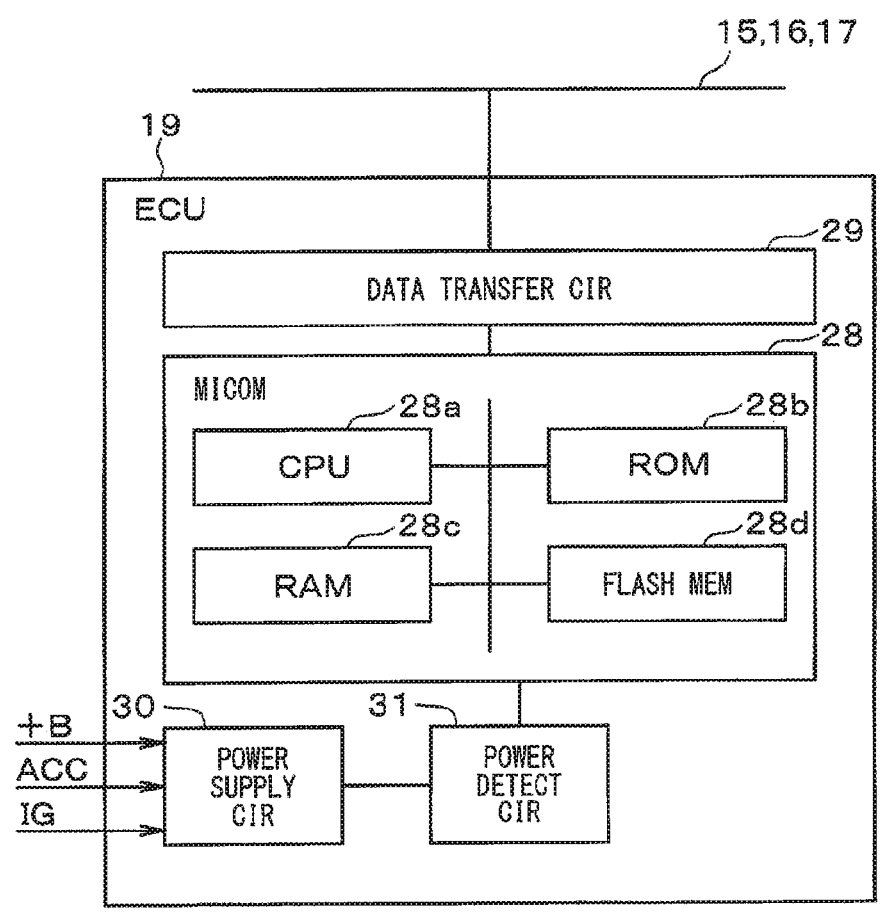
FIG. 3 is a diagram illustrating an ECU.

As shown in FIG. 3, the ECU 19 includes a microcomputer 28, a data transfer circuit 29, a power supply circuit 30, and a power detection circuit 31. The microcomputer 28 includes a CPU 28a, a ROM 28b, a RAM 28c, and a flash memory 28d. The microcomputer 28 executes various control programs stored in a non-transitory tangible storage medium (e.g., ROM) to perform various processing, thereby controlling operations of the ECU 19.

In the ECU 19, the microcomputer 28 executing the programs may provide the ECU 19 with its various functions. Dedicated circuits such as application-specific integrated circuit (ASIC) and field-programmable gate array (FPGA) may provide the ECU 19 with its various functions. Alternatively, the dedicated circuit and the microcomputer 28 executing programs, in combination, may provide the ECU 19 with its various functions. In addition, various functions provided by the ECU 19 are not limited to those provided by a single electronic control unit. A distributed system including a plurality of discrete electronic control units may implement various functions of the ECU 19.

The data transfer circuit 29 controls data communication with the buses 15 to 17 in accordance with the CAN data communication standard. The power supply circuit 30 can receives inputs of the +B power, the ACC power, and the IG power. The power detection circuit 31 detects the voltage value of the +B power, the voltage value of the ACC power, and the voltage value of the IG power input to the power supply circuit 30, compares these detected voltage values with a predetermined voltage threshold, and outputs comparison results to the microcomputer 28. The microcomputer 28 determines whether the +B power, the ACC power, and the IG power supplied to the ECU 19 from an outside of the ECU 19 are normal or abnormal based on the comparison results input from the power detection circuit 27. The ECUs 19 differ from each other in, for example, a load connected thereto such as a sensor and an actuator but basically has the same configuration. Further, the DCM 12, the in-vehicle display 7 and the power management ECU 20 have the same basic configurations as the ECU 19 shown in FIG. 3.

Figure 4:
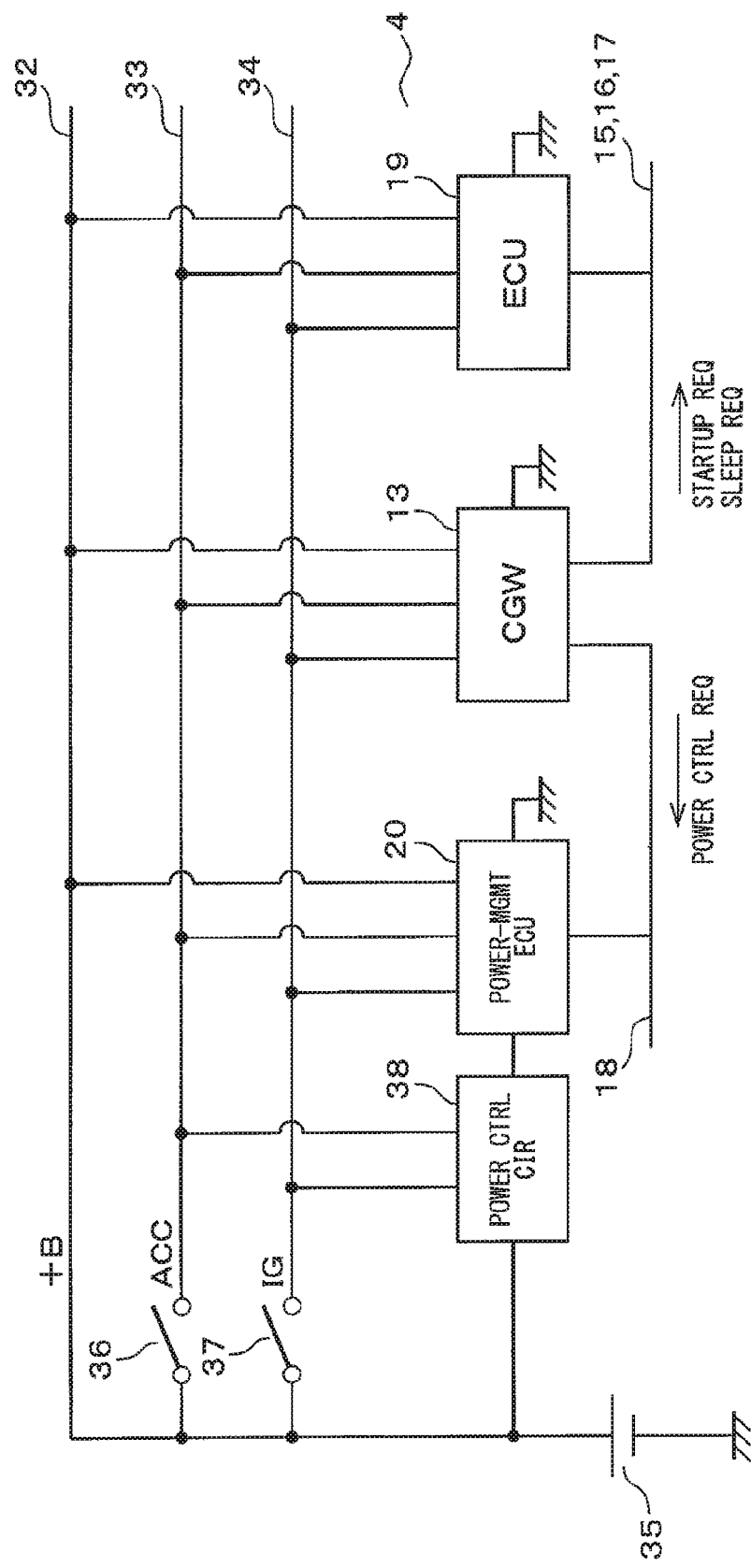
FIG. 4 is a diagram illustrating power supply lines.

As shown in FIG. 4, the power management ECU 20, the CGW 13, and the ECUs 19 are connected to a +B power supply line 32, an ACC power supply line 33, and an IG power supply line 34. The +B power supply line 32 is connected to a positive electrode of a vehicle battery 35. The ACC power supply line 33 is connected to the positive electrode of the vehicle battery 35 via an ACC switch 36. The negative electrode of the vehicle battery 35 is grounded.

When the user performs an ACC operation, the ACC switch 36 is switched from off to on, and the output voltage of the vehicle battery 35 is applied to the ACC power supply line 33. The user ACC operation is, for example, the following operation. When the vehicle is of a type in which a key is inserted into a key insertion hole, the ACC operation is such an operation that the key is inserted into the key insertion hole and rotated from an OFF position to an ACC position. When the vehicle is of a start button push type, the ACC operation is such an operation that the start button is pressed once.

The IG power supply line 34 is connected to the positive electrode of the vehicle battery 35 via an IG switch 37. When the user performs an IG operation, the IG switch 37 is switched from off to on and the output voltage of the vehicle battery 35 is applied to the IG power supply line 34. The user IG operation is, for example, the following operation. When the vehicle is of a type in which a key is inserted into a key insertion hole, the IG operation is such an operation that the key is inserted into the key insertion hole and rotated from the "OFF" position to an "ON" position. When the vehicle is of a start button push type, the ACC operation is such an operation that the start button is pressed twice.

When both the ACC switch 36 and the IG switch 37 are off, only the +B power is supplied to the vehicle system 4. A state in which only the +B power is supplied to the vehicle system 4 is referred to as a +B power state. When the ACC switch 36 is on and the IG switch 37 is off, the ACC power and the +3 power are supplied to the vehicle system 4. A state in which the ACC power and the +3 power are supplied to the vehicle system 4 is referred to as an ACC power state. When both the ACC switch 36 and the IG switch 37 are on, the +3 power, the ACC power and the IG power are supplied to the vehicle system 4. A state in which the +3 power, the ACC power and the IG power are supplied to the vehicle system 4 is referred to as an IG power state.

The ECUs 19 are classified into a +B system ECU which starts up in the +3 power state, an ACC system ECU which starts up in the ACC power state, and an IG system ECU which starts up in the IG power state. For example, the ECU 19 for such applications as vehicle theft is the +3-system ECU. For example, the ECU 19 for such non-traveling applications as audio application is an ACC system ECU. For example, the ECU 19 for such traveling applications as engine control is an IG system ECU.

The CGW 13 sends a startup request to the ECU 19 in a sleep state, causing the startup request sending destination ECU 19 to shift from the sleep state to a started-up state. Further, the CGW 13 sends a sleep request to the ECU 19 in the started-up state, causing the sleep request sending destination ECU 19 to shift from the started-up state to the sleep state. The CGW 13 selects the startup request sending destination ECU 19 and the sleep request sending destination ECU 19 from among the multiple ECUs 19 by making different the waveforms of transmission signals transmitted to the buses 15 to 17.

A power control circuit 38 is connected in parallel with the ACC switch 36 and the IG switch 37. The CGW 13 sends a power control request to the power management ECU 20, and causes the power management ECU 20 to control the power control circuit 38. Specifically, the CGW 13 sends a power supply start request, which is one kind of the power control request, to the power management ECU 20 to cause, inside the power control circuit 38, the ACC power supply line 33 or the IG power supply line 34 to be connected to the positive electrode of the vehicle battery 35. In this state, even if the ACC switch 36 or the IG switch 37 is in off, the ACC power or IG power is supplied to the vehicle system 4. The CGW 13 sends a power supply stop request, which is another kind of the power control request, to the power management ECU 20 to cause, inside the power control circuit 38, the ACC power supply line 33 and the IG power supply line 34 to be disconnected from the positive electrode of the vehicle battery 35.

The DCM 12, the CGW 13, and the ECUs 19 each have a power self-holding function. Specifically, when The DCM 12, the CGW 13, and the ECUs 19 are in the started-up state and the power switches over from the ACC power or the IG power to the +B power, the DCM 12, CGW 13 and ECU 19 do not immediately shift from the started-up state to the sleep state or the stop state but maintain the started-up state for a predetermined time period by self-holding their operating power. The DCM 12, CGW 13, and ECU 19 shift from the started-up state to the sleep state or the stop state after the predetermined time period (for example, several seconds) has elapsed since the vehicle power switched over from the ACC power or the IG power to the +B power.

Next, the distribution package distributed from the center apparatus 3 to the master device 11 will be described with reference to FIGS. 5 to 6.

In the vehicle program rewriting system 1, reprogramming data is generated from: writing data provided by the supplier being a provider of the application program; and rewriting specification data mainly provided by the OEM. The writing data provided by the supplier includes: difference data corresponding to a difference between an old application program and a new application program; and all data corresponding to the new application program as a whole. The difference data and the all data may be compressed by a known data compression technique.

Figure 5:
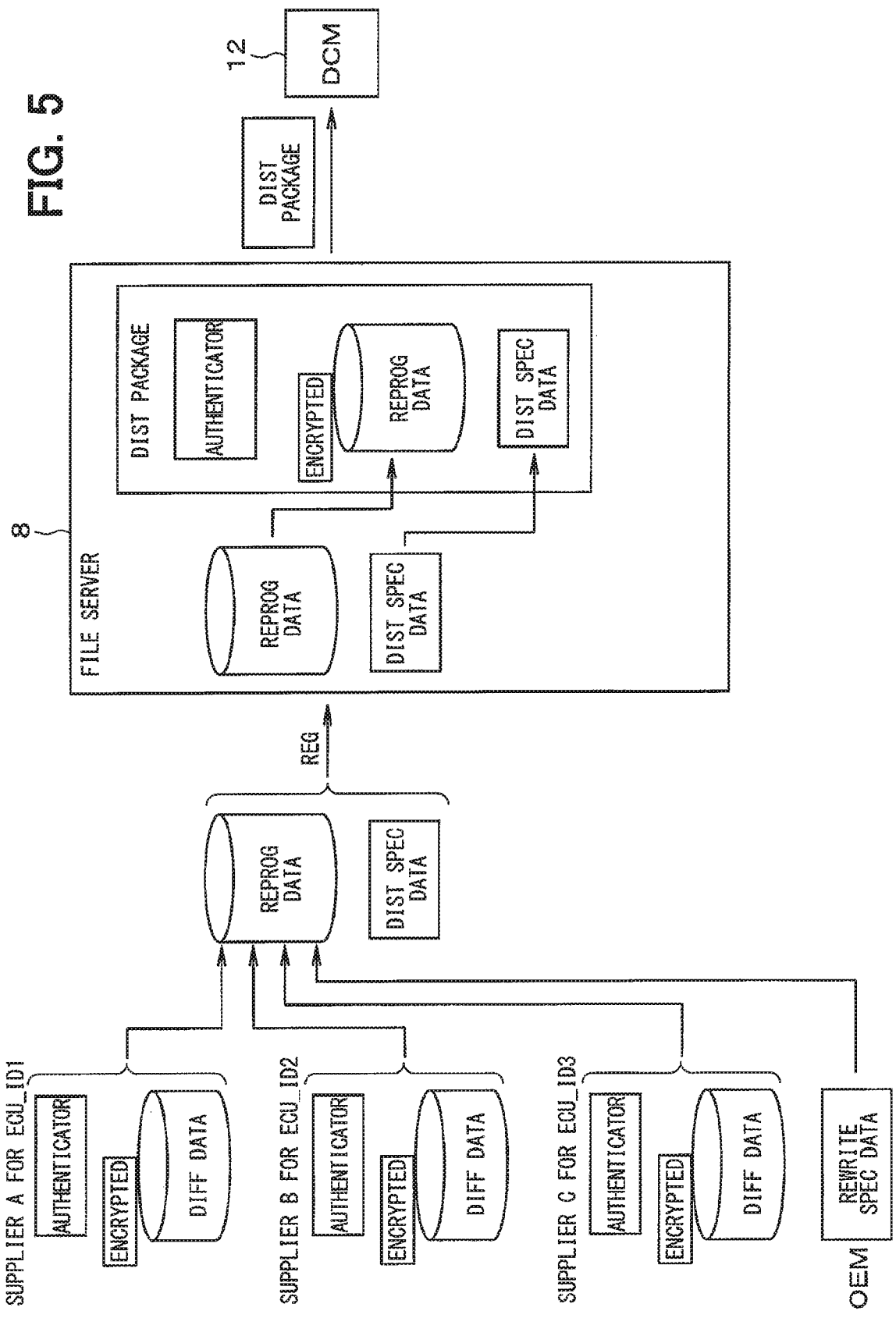
FIG. 5 is a diagram illustrating packaging of reprogramming data and distribution specification data.
Figure 6:
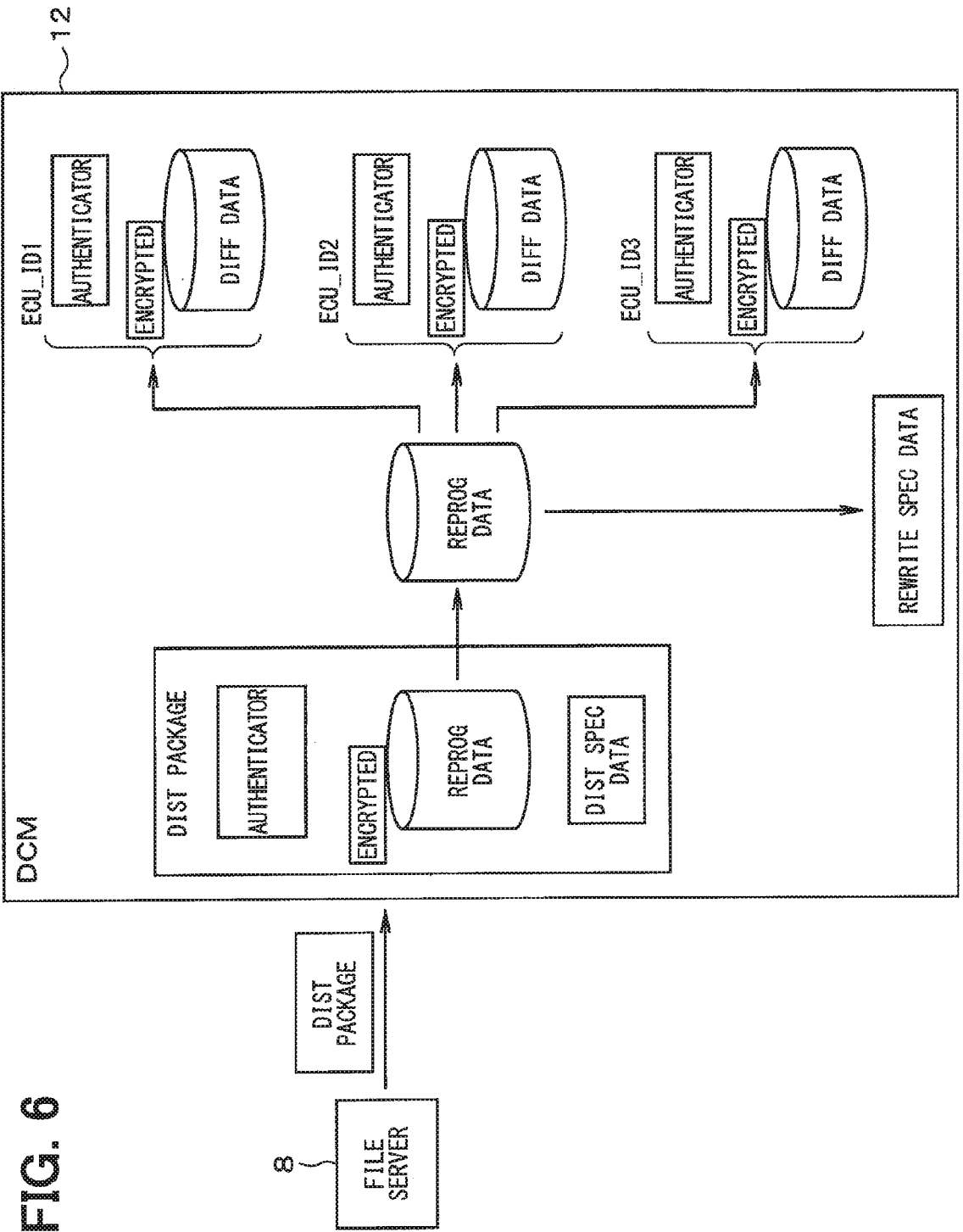
FIG. 6 is a diagram illustrating un-packaging of a distribution package.

FIG. 5 illustrates the following case, Suppliers A to C each provide the difference data. Specifically, encrypted difference data and authenticator are provided from the supplier A for the ECU with ID1. Encrypted difference data and authenticator are provided from the supplier B for the ECU with ID2. Encrypted difference data and authenticator are provided from the supplier C for the ECU with ID3. The rewriting specification data is provided from the OEM. The reprograming data is generated from these data. In the above, the authenticator is given for each writing data.

Although FIG. 5 illustrates the difference data that is used for updating from the old application program to the new application program, rollback difference data for writing back from the new application program to the old application program may be further included in the reprograming data. For example, in the case where the rewrite target ECU 19 is of a single memory area type, the difference data for rollback may be included in the reprograming data.

The rewriting specification data provided by the OEM includes information involved in the rewriting of the application program. Specifically, the rewriting specification data provided by the OEM includes: information to identify the rewrite target ECU 19; information to identify an order in which the rewriting is performed in cases where there are a plurality of rewrite target ECUs 19; and information to identify a rollback manner. These kinds of information are data defining how the DCM 12, the CGW 13 and the rewriting target ECU 19 should perform rewriting-related operations. The rewriting specification data is dividable into rewriting specification data for DCM and the rewriting specification data for CGW. In the rewriting specification data for DCM, information necessary for reading out a file corresponding to the rewrite target ECU 19 is described. In the rewriting specification data for CGW, information necessary for the control of the rewriting in the rewrite target ECU 19 is described.

When the DCM 12 acquires the rewriting specification data for DCM, the DCM 12 analyzes it and performs control operations involved in the rewriting such as transferring the writing data to the CGW 13 in accordance with the analysis result. When the CGW 13 acquires the rewriting specification data for CGW, CGW 13 analyzes it and performs control operations involved in the rewriting such as acquiring the writing data from DCM 12 and transferring the writing data to the rewrite target ECU 19 in accordance with the analysis result.

As shown in FIG. 5, the reprogramming data described above and the distribution specification data provided by the OEM are registered in the file server 8. The distribution specification data provided by the OEM includes data defining operations involved in the display of various screens on the display terminal 5.

When the reprograming data and the distribution specification data are registered in the file server 8, the file server 8 encrypts the reprogramming data. Further, the file server 8 generates a distribution package by packaging a package authenticator for authenticating the package, the encrypted reprograming data, and the distribution specification data into a single file. When the file server 8 accepts a distribution package download request from the outside, the file server 8 sends the distribution package to the DCM 12. Although FIG. 5 illustrates the case where the file server 8 generates the distribution package storing both the reprogramming data and the distribution specification data to simultaneously send the reprogramming data and the distribution specification data to the DCM 12, the file server 8 may separately send the reprogramming data and the distribution specification data to the DCM 12. For example, the file server 8 may send the distribution specification data to the DCM 12 first, and then may send the reprogramming data to the DCM 12. Alternatively, the file server 8 may put the reprogramming data and the distribution specification data into the distribution package being a single file, and may send the distribution package and the package authenticator to the DCM 12.

When the DCM 12 downloads the distribution package from the file server 8, the DCM 12 authenticates the package authenticator and the encrypted reprograming data stored in the distribution package. If the authentication is successful, the DCM 12 decrypts the encrypted reprograming data. When the DCM 12 decrypts the encrypted reprogramming data, the DCM 12 unpackages the decrypted reprogramming data to generate the encrypted difference data and the authenticator for a respective ECU, the rewriting specification data for DCM, and the rewriting specification data for CGW. FIG. 6 illustrates a case where the DCM 12 generates: the encrypted difference data and the authenticator for the ECU with the ID1; the encrypted difference data and the authenticator for the ECU with the ID2; the encrypted difference data and the authenticator for the ECU with the ID3; and the rewriting specification data.

Figure 7A:
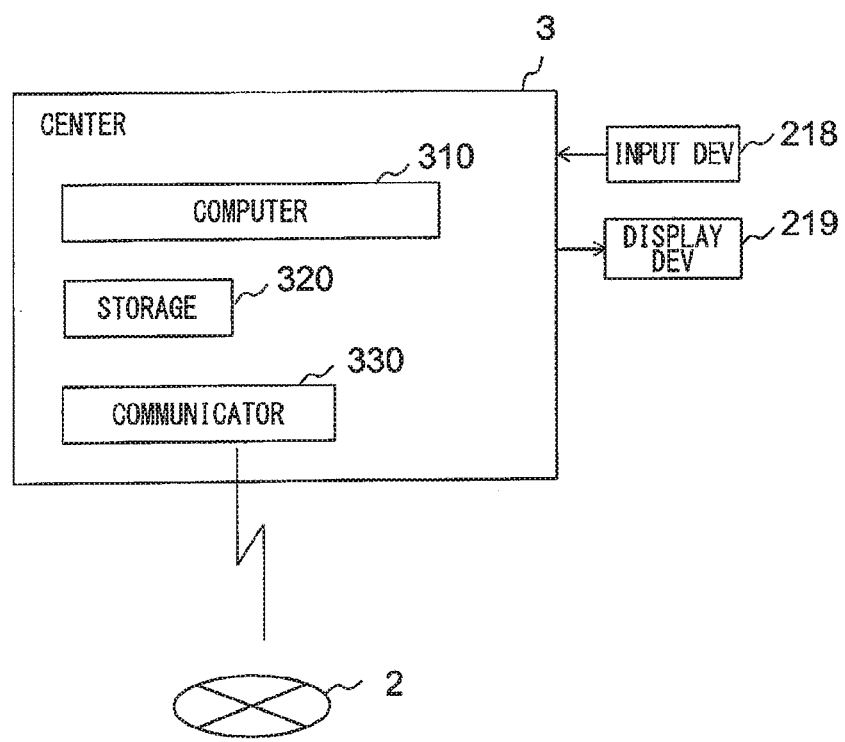
FIG. 7A is a diagram illustrating a hardware configuration of a center apparatus.

FIG. 7A is a diagram illustrating a hardware configuration of the center apparatus 3. The center apparatus 3 includes a center computer 310, a storage device 320, and a center communicator 330.

The center computer 310 includes a central processing unit (CPU), a read only memory (ROM), a random access memory (RAM), and a flash memory. The center computer 310 performs various processes by the CPU executing various control programs stored in a non-transitory tangible storage medium (e.g., ROM), thereby functioning as various sections and units of the center apparatus 3; such as sections and units illustrated in FIG. 7B.

Figure 7B:
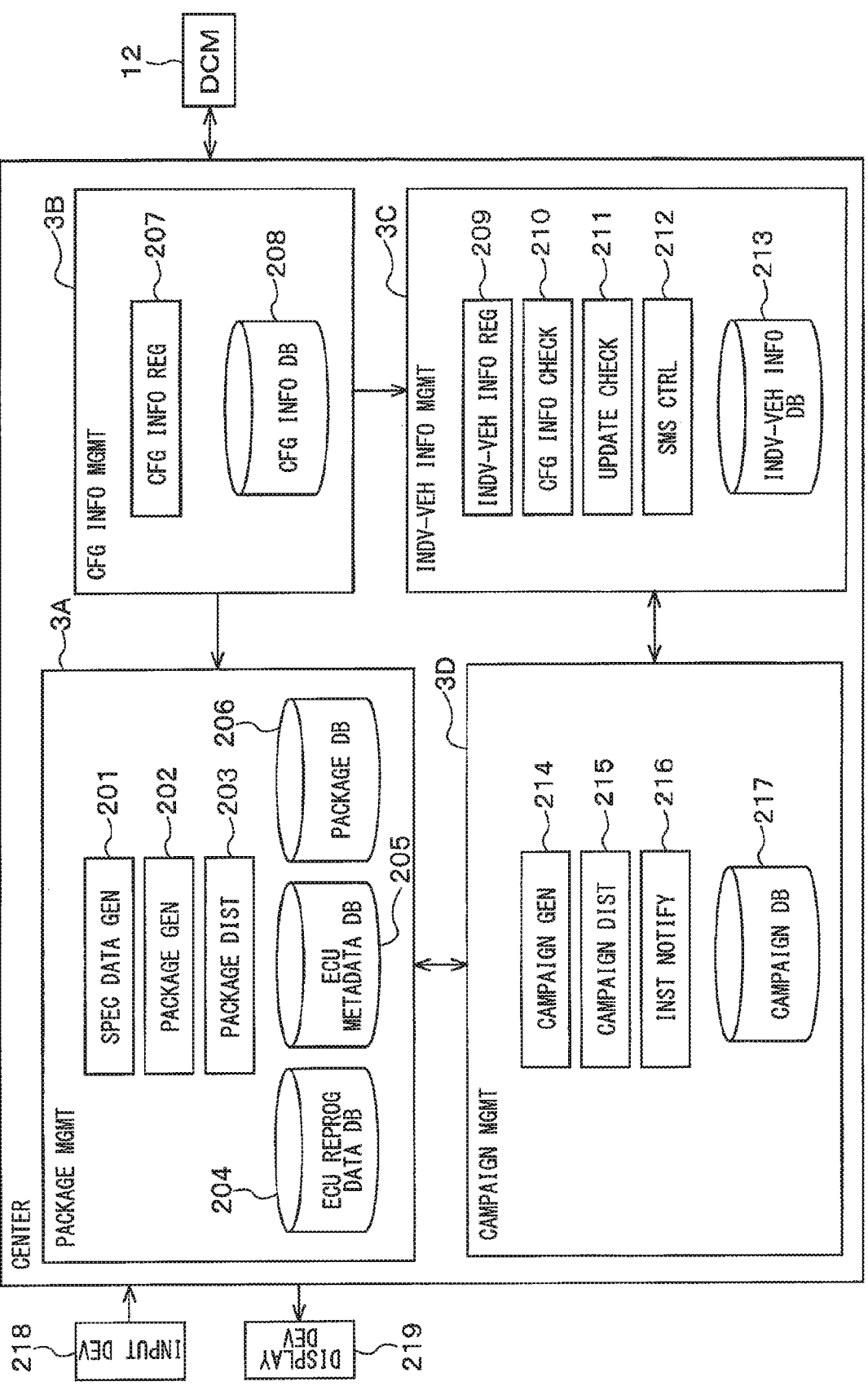
FIG. 7B is a block diagram illustrating functions of a center apparatus.

The storage device 320 includes a non-volatile storage device such as a hard disk drive (HOD) and a solid state drive (SSD), and provides various databases; such as databases of the center apparatus 3 illustrated in FIG. 7B.

The center communicator 330 is a communication device communicable with the DCM 12 and the portable terminal 6 via the communication network 2. Using the center communicator 330, the center computer 310 can communicate with the DCM 12 and the portable terminal 6 via the wireless communications.

An input device 218 and a display device 219 provide user interface (UI) functions to the center apparatus 3.

In the center apparatus 3, the CPU executing the programs provides the center computer 310 with the various functions (the sections and units in FIG. 7B and the like). However, this is not limiting. Dedicated circuits such as application-specific integrated circuit (ASIC) and field-programmable gate array (FPGA) may provide the center computer 310 with the various functions. Alternatively, the dedicated circuit and the CPU executing programs, in combination, may provide the center computer 310 with the various functions. In addition, various functions and various databases provided by the center apparatus 3 are not limited to those provided by a single computer and a single storage device. A distributed system including a plurality of computers and a plurality of storage devices communicable via a plurality of communicators may implement various functions and various databases provided by the center apparatus 3.

Figure 8:
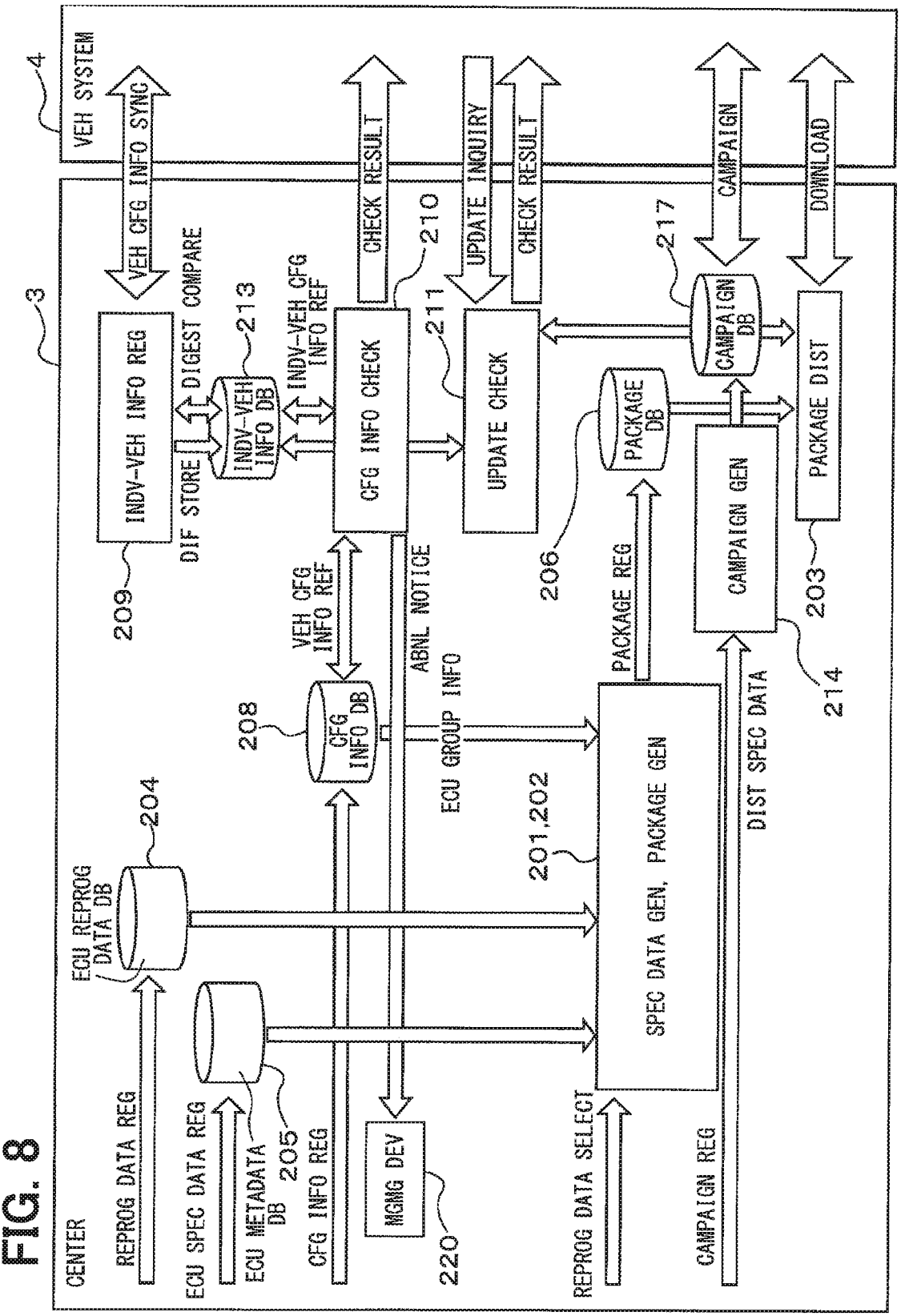
FIG. 8 is a diagram illustrating a data flow in a center apparatus.

FIG. 7B is a block diagram illustrating functions of the center apparatus 3, in other words, functions of the servers 8 to 10. FIG. 8 schematically illustrates processes performed by the center apparatus 3 in connection with ECU program updates. In the present disclosure, database may be referred to as DB.

As shown to FIG. 7B, the center apparatus 3 includes a package management section 3A, a configuration information management section 3B, an individual vehicle information management section 3C, and a campaign management section 3D. The package management section 3A includes a specification data generation unit 201, a package generation unit 202, a package distribution unit 203, an ECU reprograming data DB 204, an ECU metadata DB 205, and a package DB 206. The ECU reprograming data DB 204, the ECU metadata DB 205, and the package DB 206 correspond to an update data DB. The configuration information management section 3B includes a configuration information registration unit 207 and a configuration information DB 208.

The supplier registers individual ECU specific data using the input device 218 and the display device 219 which act as user interface (UI) functions of the management server 10. The individual ECU specific data include: a program file such as new program and difference data; authentication data and sizes of the program file; program file related information such as an encryption method; and information related to ECU attribute information such as a memory structure of the ECU 19. The program file is stored in the ECU reprograming data DB 204. The ECU attribute information is stored in the ECU metadata DB 205. The program file related information may be stored in the ECU reprograming data DB 204 or may be stored in the ECU metadata DB 205. The ECU reprograming data DB 204 is an example of update data storage. The ECU metadata DB 205 is an example of device related information storage. The ECU metadata DB 205 is an example of a device-relating information storage.

On a vehicle-model-by-vehicle-model basis, the OEM registers approved configuration information in the configuration information DB 208 via the configuration information registration unit 207. Specifically, the OEM of a vehicle registers a plurality of approved configuration information entries in association with a respective one of vehicle models of the vehicle. The approved configuration information includes identification information on approved hardware and software of the ECUs 19 mounted in the vehicle, and is an example of vehicle-related information. The approved configuration information includes identification information of an approved system configuration being an approved ECU group configuration. The approved ECU group configurations may be expressed in form of the below-described approved ECU SWID combinations and/or the below-described Sys IDs. The approved configuration information further includes identification information of an approved vehicle configuration which may represent an approved configuration of a plurality of systems in the vehicle. The information registered by the OEM may include vehicle restriction information relating to restriction on a program update in the vehicle. For example, ECU group information, a bus load table, information on battery load and the like are registered, which are used to generate the rewriting specification data. The configuration information DB 208 is an example of vehicle information storage.

The specification data generation unit 201 accesses various DBs and generates the rewriting specification data. The package generation unit 202 generates the distribution package containing the rewriting specification data and the reprogramming data, and registers the distribution package in the package DB 206. The package generation unit 202 may generate the distribution package further containing the distribution specification data. The package distribution unit 203 distributes the registered distribution package to the vehicle system 4. The distribution package corresponds to a file.

The individual vehicle information management section 3C includes an individual vehicle information registration unit 209, a configuration information check unit 210, an update presence/absence check unit 211, a short massage service (SMS) sending control unit 212, and an individual vehicle information DB 213. The individual vehicle information registration unit 209 registers vehicle information of each individual vehicle uploaded from each individual vehicle in the individual vehicle information DB 213 in association with, for example, a respective VIN. The vehicle information of each individual vehicle is also called a vehicle information entry.

The individual vehicle information registration unit 209 may register the vehicle information at the time of vehicle production or vehicle sale in the individual vehicle information DB 213 as its initial values. When registering the vehicle information uploaded from a vehicle belonging to a certain vehicle model, the configuration information check unit 210 collates the uploaded vehicle information with the approved configuration information associated with the certain vehicle model registered in the configuration information DB 208. The update presence/absence check unit 211 checks whether an update resulting from a new program is available based on the vehicle information. Specifically, the update presence/absence check unit 211 checks the presence and absence of the campaign available. When the vehicle information in the individual vehicle information DB 213 is updated, the SMS sending control unit 212 sends an update-related message to the corresponding vehicle by SMS (Short Message Service).

The campaign management section 3D includes a campaign generation unit 214, a campaign distribution unit 215, an instruction notification unit 216, and a campaign DB 217 (corresponding to an update data DB). With the campaign generation unit 214, the OEM generates campaign information including information on program update. The OEM registers the campaign information in the campaign DB 217. The campaign information corresponds to the distribution specification data described above, and mainly includes information relating to updated contents to be displayed by the vehicle system 4. The campaign distribution unit 215 distributes the campaign information to the vehicle. The instruction notification unit 216 notifies the vehicle about the necessary instructions related to the program update. In the vehicle system 4, for example, the user may input his decision on determine whether to download the update program based on the campaign information sent from the center apparatus 3. When the user decides to download it, the download is performed.

Next, the contents of data registered in respective databases will be described.

Figure 9:
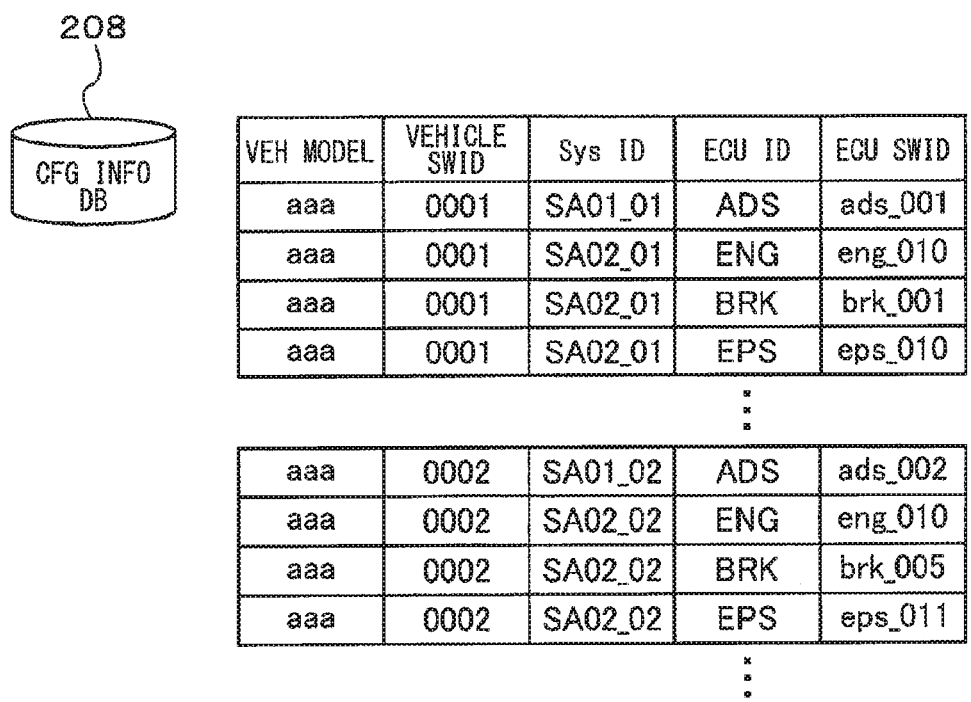
FIG. 9 is a diagram illustrating configuration information registered in a configuration information database (DB) in association with a vehicle model.

As shown in FIG. 9, the data registered in the configuration information DB 208 includes: a vehicle model which specifies the model of the vehicle; a vehicle software identifier (vehicle SWID) which is a software identifier of the vehicle as a whole. Only a single vehicle SWID is assigned to each individual vehicle. The vehicle SWID is updated when application program version in any one or more of the ECUs mounted in the vehicle is updated. The data registered in the configuration information DB 208 further includes a system ID (Sys ID) which is an ID of a respective one of the systems, assuming that a group of ECUs 19 mounted in the vehicle is called a system.

For example, in the case of FIG. 1, the group of body ECUs 19 constitutes a body system, and the group of traveling ECUs 19 constitutes a traveling system. The Sys ID is associated with a corresponding system and is updated when application program version in any one or more of the ECUs constituting the corresponding system is updated. The data registered in the configuration information DB 208 further includes an ECU ID which is associated with each individual ECU for ECU type identification. The data registered in the configuration information DB 208 further includes an ECU software ID (ECU SWID) which acts as a software ID of each individual ECU, For illustrative purpose, it is assumed that the ECU SWID is expressed as the ECU ID plus version of software in its ECU. The ECU SWID is updated when the version of the application program of the corresponding ECU is updated. In addition, even if the version of the application program of the ECU is unchanged (kept the same), the ECU SWID may be updated when data such as control parameters used by the ECU is updated. Further, even if the program version and the control data are the same, different ECU SWIDs are assigned to ECUs that have identical ECU ID but have different hardware configurations. Specifically, the ECU SWID has one-to-one correspondence to the part number of the ECU. In this regard, it is possible to call the ECU SWID an ECU configuration identifier (abbreviated as ECU CFG-ID), As described above, each individual ECU having thereon installed software is associated with the ECU SWID (also called the ECU CFG-ID) which is changed together at least with change in software (application program, control data, etc.) of its ECU. The ECU CFG-ID may have a first part which is changed together with a change in software (application program, control data, etc.) of its ECU and a second part which differs according to ECU hardware configuration.

FIG. 9 illustrates the approved configuration information of vehicles belonging to the vehicle type=aaa. Among the various ECUs 19 mounted in the vehicle, FIG. 9 illustrates an autonomous driving ECU having the ECU ID=ADS, an engine ECU having the ECU ID=ENG, a brake ECU having the ECU ID=BRK, and an electric power steering ECU having the ECU ID=EPS.

In FIG. 9, the ECU SWIDs associated with the vehicle SWID=0001 include ads_001, eng_010, brk_001, and eps_010. The ECU SWIDs associated with the vehicle SWID=0002 include ads_002, eng_010, brk_005, and eps_011. Comparison between the vehicle SWID=0001 and the vehicle SWID=0002 shows that software update exists for the three ECUs, the autonomous driving ECU, the brake ECU and the electric power steering ECU. Further, the comparison between the vehicle SWID=0001 and the vehicle SWID=0002 shows the update of Sys ID from SA01 to SA02 and from SA02 to SA03. The initial values of the approved configuration information are registered in the configuration information DB 208 at the time of vehicle production or vehicle sale, and then a new entry of the approved configuration information is added as the updated version of the application program for any one or more ECUs appears. Specifically, in association with a respective vehicle model, multiple entries of the configuration information approved for use in the market may be registered. This registration is done for a plurality of vehicle models of a respective vehicle.

FIG. 10 illustrates the program and data registered in the ECU reprograming data DB 204. FIG. 10 assumes that there are the update application programs for the autonomous driving ECU (ADS), the brake ECU (BRK), and the electric power steering ECU (EPS) among the ECUs 19 mounted in a certain vehicle type. For a respective one of these update available ECUs 19, the data registered in the ECU reprograming data DB 204 includes: a file of an old program and a file of new program for the corresponding ECU; integrity verification data for the new program; an update data file including a difference data between the old program and the new program; integrity verification data for the difference data; a file of rollback data including a difference data; and integrity verification data for the rollback data. The integrity verification data includes a hash value obtained by applying a hash function to data values. When the whole data of the new program is used as the update data in place of the difference data, the integrity verification data for the update data may be the same as that for the new program.

Although a data structure of the reprograming data associated with the latest ECU SWID is illustrated in FIG. 10, this is not limiting. For example, the ECU reprograming data DB 204 may be configured to store the reprograming data for the old ECU SWID. In this case, the new program file associated with the one-previous ECU SWID may be used for the old program file associated with the latest ECU SWID. One or more or all of the integrity verification data may be computed by the supplier and then registered, or may be computed by the center apparatus 3 and then registered.

Figure 11:
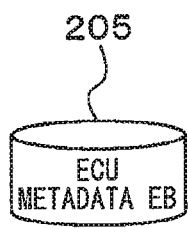
FIG. 11 is a diagram strating specification data registered in an ECU metadata DB.

As shown in FIG. 11, the specification data for each ECU registered in the ECU metadata DB 205 is associated with the ECU SWID, The data associated with the latest ECU SWID include: the size of update data file; the size of rollback data file; transfer size; a read address of the program file. When the flash memory 28*d* of the ECU 18 has two or more memory areas, the data associated with the latest ECU SWID may further include memory area information specifying the memory area (e.g., A area or B area) for the application program. These are examples of update data related information.

Further, attribute information indicating an attribute of the ECU 19 is registered in the ECU metadata DB 205. The attribute information includes information indicating hardware attribute and software attribute related to the corresponding ECU. The transfer size indicates a data transfer size when the rewriting data after divided is transferred from the CGW 13 to the corresponding ECU 19. The key is a security key used when the CGW 13 accesses the ECU 19. These are examples of software attribute information.

As shown in FIG. 11, the ECU metadata DB 205 further include the hardware attribute information in association with a respective vehicle model and a respective ECU ID. The hardware attribute information includes; the memory configuration of the flash memory 28*d* of the corresponding ECU 19; the type of bus to which the corresponding ECU 19 is connected; and the type of power supply connected to the ECU 19.

With regard to the memory configuration of the flash memory of the ECU 19, some ECU 19 may have a single memory area configuration, some other ECUs 19 may have a two memory area configuration, and some yet other other ECUs 19 may have a pseudo two memory area configuration. The hardware attribute information and the software attribute information are used by the vehicle system 4 for the rewriting control of the individual ECUs 19. It is possible that the CGW 13 manages and retains the hardware attribute information. In some embodiments however, the center apparatus 3 manages the hardware attribute information in order to reduce the load on the vehicle system 4. The software attribute information acts as data that directly designates operations for rewriting software of each individual ECU 19. In view of this, the center apparatus 3 manages the software attribute information in order to implement flexible control in the vehicle system 4.

Figure 12:
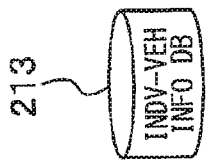
FIG. 12 is a diagram illustrating vehicle information registered in an individual vehicle information DB in association with each individual vehicle.

As shown in FIG. 12, the data of each individual vehicle also called the vehicle information is registered in the individual vehicle information DB 213. The data registered includes configuration information of each individual vehicle (also referred to as individual vehicle configuration information) and individual vehicle status information on program update. Specifically, the individual vehicle configuration information is registered in association with a respective vehicle identification number (VIN) being a unique vehicle identifier and includes the vehicle SWID, the Sys IDs, the ECU IDs and the ECU SWIDs.

A digest value, which is a hash value of the individual vehicle information of a respective vehicle in some embodiments, is also calculated by the center apparatus 3 and stored in the individual vehicle information DB 213. In association with the ECU having the two or more memory area configuration, the in-use memory area is registered in the individual vehicle information DB 213. The in-use memory area is uploaded from each individual vehicle together with the vehicle information and specifies which of the memory areas is a memory area storing thereon the program currently in use. The hash value generated by the center apparatus 3 (specifically, by the center computer 310) and registered in the individual vehicle information DB 213 is also referred to as a verification hash value in the present disclosure.

The verification hash value can be generated, for example, as follows. The center computer 310 applies the registered ECU SWIDs associated with a respective VIN in the individual vehicle information DB 213 to a hash function. When using the SHA-256 as the hash function, the center computer 310 calculates the verification hash value in the following manner. The center computer 310 serially connects the values of the ECU SWIDs to obtain a data value and divides the data value into message blocks each having a 64-bytes long, applies the data value of the first message block to an initial hash value (e.g., random number) to obtain a hash value of 32-bytes long, and successively applies the obtain data value to the next message block and finally obtains the verification hash value. In the above, the center computer 310 may further use the vehicle SWID, the Sys IDs, and the memory configuration information etc. to generate a single verification hash value for each individual vehicle and register the generated verification hash value in the individual vehicle information DB 213.

The individual vehicle information DB 213 contains an access log and a reprograming status in association with each individual vehicle. As shown in FIG. 12, the access log includes the date and time of uploading the individual vehicle information from the vehicle to the center apparatus 3. The reprograming status indicates a status of reprograming on the vehicle, and may indicate, for example, campaign issued, activation completed, download completed, and the like. From this progress status, it can be checked which phase the reprogramming in the vehicle has progressed and in which phase it has stagnated.

Figure 13:
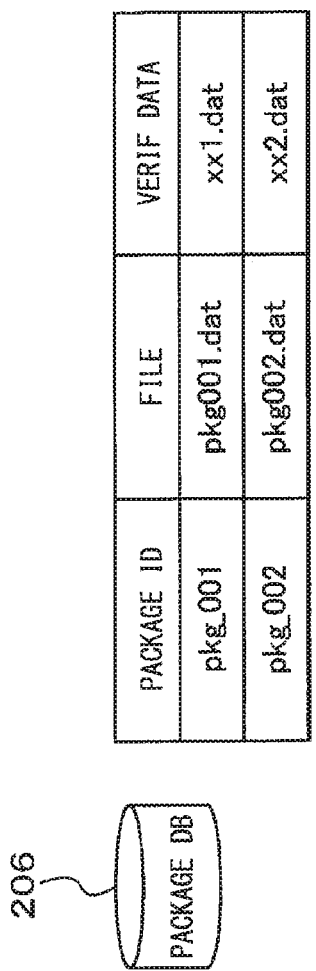
FIG. 13 is a diagram illustrating distribution package data registered in a package DB.

As shown in FIG. 13, an ID of the distribution package, the corresponding distribution package file, and the corresponding data for integrity verification of the distribution package are registered in the package DB 206 (corresponding to the update data DB).

Figure 14:
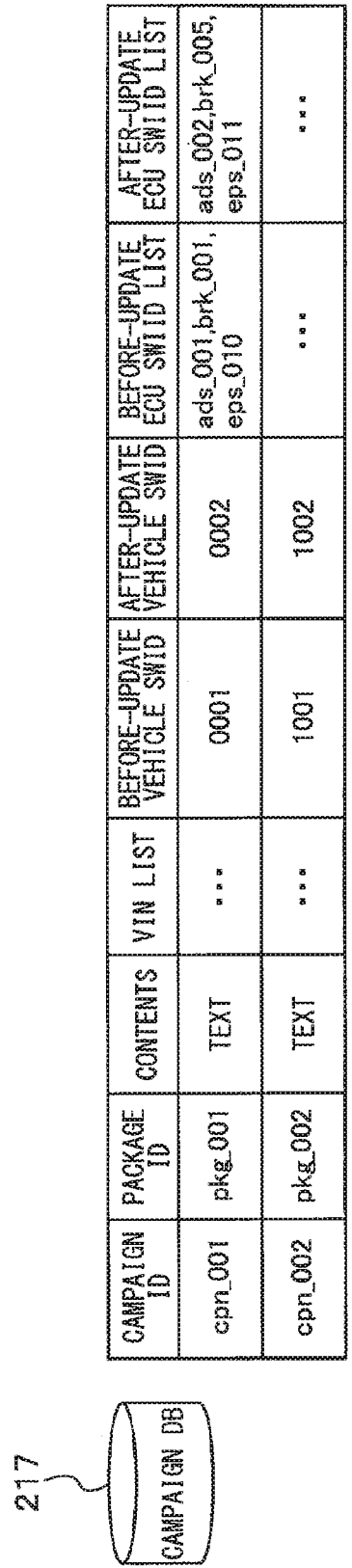
FIG. 14 is a diagram illustrating campaign data registered in a campaign DB.

As shown in FIG. 14, various data is registered in the campaign DB 217. The registered data includes: a campaign ID; a distribution package ID; message information such as text contents concretely indicating update contents as campaign contents; a target VIN list being a list of VINs indicating vehicles available to the corresponding campaign; a vehicle SWID before the update; a vehicle SWID after the update; a list of ECU SWIDs before the update; a list of ECU SWIDs after the update. The VIN list can be registered by collating the individual vehicle information DB 213 with the campaign DB 217. The above campaign information may be also registered in the package DB 206.

Figure 15:
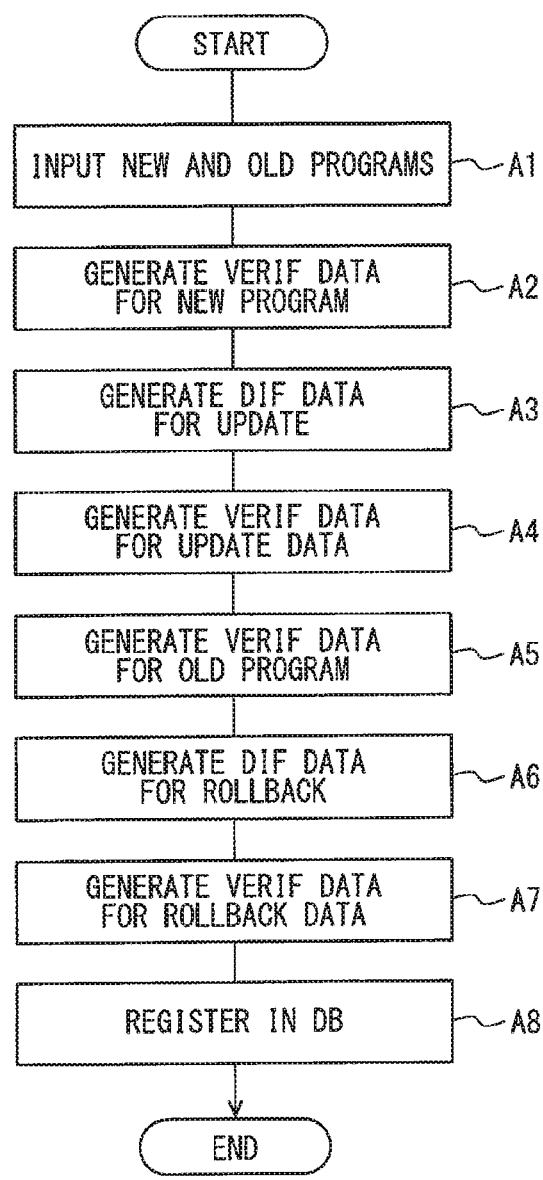
FIG. 15 is a flowchart illustrating processes for generating programs and data registered in an ECU reprogramming data database (DB)

Now, the processes performed by the vehicle program rewriting system 1 will be described. With reference to FIG. 15, the processes for registration in the ECU reprograming data DB 204 will be described first.

As shown in FIG. 15, at A1, with the input device 18 and the display device 219, the management server 10 starts a screen for reprograming data registration. The input device 218 receives inputs of new and old program file of the ECU 19 from an operator of the corresponding supplier. For example, the UI or the like may be used to register a file of the configuration information in a common-separated values (CSV) format or the like. Subsequently, at A2, the package management unit 3A generates the integrity verification data for the new program. At A3, the package management unit 3A generates the difference data file including difference data for update to the new program based on the old program. At A4, the package management unit 3A generates the integrity verification data for the update difference data.

Next, At A5, the package management unit 3A generates the difference data file including difference data for rollback to the old program based on the new program. At A6, the package management unit 3A generates the integrity verification data for the rollback difference data. At A7, these program files and verification data are registered in the ECU reprograming data DB 204 and a new ECU SWID is generated and registered based on the one-previous ECU SWID. In the above, when the center apparatus 3 is configured to distribute the whole data in stead of the difference data, the steps concerning the difference data are omittable.

The integrity verification data is, for example, a hash value generated with a hash function. For example, when using SHA-256 (Secure Hash Algorithm 256-bit) as the hash function, the data value is divided into message blocks in units of 64 bytes. Then, the data value of the first message block is applied to the initial hash value and a 32-byte long hash value is obtained. The data value of the next message block is applied to the obtained hash value successively. Finally, the 32-byte long has value is obtained.

Figure 16:
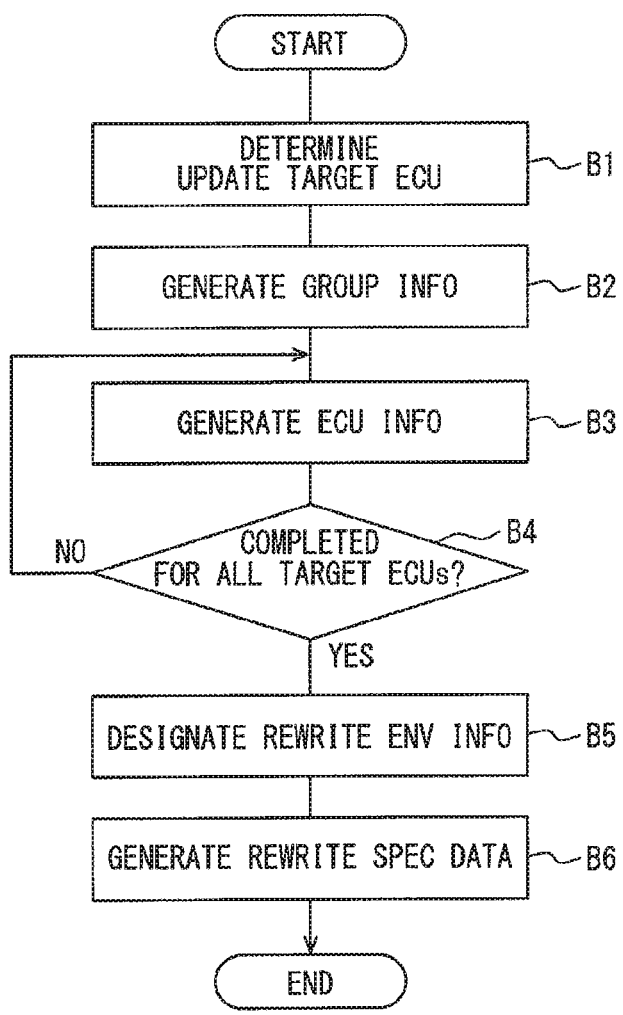
FIG. 16 is a flowchart illustrating processes for generating specification data registered in an ECU metadata DB.

With reference to FIG. 16, the rewriting specification data generation processes performed by the specification data generation unit 201 will be described. In the below, the processes for generating the rewriting specification data for the vehicle model=aaa will be described by way of example. It is noted that the processes are the same as those for generating the rewriting specification data for other vehicle models.

The center apparatus 3 starts up a specification data generation program of the specification data generation unit 201, and receives inputs from an OEM operator via the display device 219 and the input device 218. First, at B1, the specification data generation unit 201 determines the update available ECU 19 called also the update target ECU 19 as shown in FIG. 16. Specifically, the specification data generation unit 201 accesses the ECU reprograming data DB 204 and displays on the display device 219 a display screen on which the ECU(s) for update are selectable from among the registered ECU SWIDs. The specification data generation unit 201 retains, in a specific ECU order, the ECU SWIDs selected by the OEM operator via the input device 218. Here, the specific ECU order indicates an order in which the ECUs 19 are to be rewritten in the vehicle system 4. The specification data generation unit 201 sets the specific ECU order to the order designated by the OEM operator.

The specification data generation unit 201 may access the configuration information DB 208 and determine the update ECU 19 (ECU to be updated), without receiving inputs from the OEM operator. The specification data generation unit 201 extracts the ECU(s) 19 to be updated, with reference to the ECU SWIDs associated with the latest vehicle SWID and the ECU SWIDs associated with the one-previous vehicle SWID. For example, in the case of FIG. 9, the update target ECUs 19 are the ECUs having the ECU ID=ADS, the ECU ID=BRK, and the ECU ID=EPS. The specification data generation unit 201 sets the specific ECU order to the order registered in the configuration information DB 208.

Then, at B2, the specification data generation unit 201 generates the group information for the ECU SWIDs of the update target ECUs. For example, by referring to the configuration information DB 208 and using the Sys ID, the specification data generation unit 201 puts the ECU IDs associated with the SyS ID=SA01_02 into a first group group and puts the ECU IDs associated with the Sys ID=SA02_02 into a second group. For example, in the case of FIG. 9, the first group has the ECU ID=ADS. The second group has the ECU ID=BRK and the ECU ID=EPS in this order. In this manner, the specification data generation unit 201 determines the update target ECUs and the groups of ECUs and the order of ECUs in a respective group.

Next, at B3, the specification data generation unit 201 accesses the ECU metadata DB 205 and acquires the specification data of the update target ECU 19 including the update data related information, the hardware attribute information, and the software attribute information. For example, as shown in FIG. 17, the update data related information may include: an update program version; an update program acquisition address; a update program size; a rollback program version; a rollback program acquisition address; a rollback program size; a writing data type; and a writing memory area. The hardware attribute information may include: a connected bus; a connected power; and a memory type. The software attribute information include: rewrite memory area information; security access key information; a rewriting method; and a transfer size. The rewriting method indicates power control for the rewriting. Specifically, the rewriting method indicates whether the rewriting is to be performed by enabling the power self-holding function upon change from the IG on to the IG off or the rewriting is to be performed in accordance with the IG on and the IG off. Information other than the key may be included as the security access key information.

The above data items will be more specifically described. The writing data type indicates whether the update is implemented with the difference data or the whole data. The writing data type for the update and the writing data type for the rollback may be separately described. The writing memory area information is given to the ECU 19 having the two memory area configuration and indicates in which one of the memory areas the program is to be written. The connected bus information identifies a bus to which the ECU 19 is connected. The connected power information indicates the state of the power supply connected to the ECU 19. The connected power information contains a value indicating one of the battery power (+B power), the accessory power (ACC power), and the ignition power (IG power). The memory type information identifies the memory configuration of the ECU and contains a value indicating whether the ECU has the two memory area configuration, the pseudo two memory area configuration (the single memory area suspend type), the single memory area or the like. The rewriting memory area information indicates which of the memory areas is the activation memory area (in-use memory area) and which of the memory areas is the rewriting target memory area (out-of-use memory area). The security access key information is for access authentication to the ECU 19 using a key, and includes information of a key derivation key, a key pattern, and a decryption operation pattern. The transfer size information indicates a data size when the program is divided and transferred to the ECU 19.

For example, as shown in FIG. 17, these kinds of information are associated with a respective ECU ID. In the specification data, the information entries for respective ECUs are retained in the above-described specific ECU order. When the steps B1 to B3 are completed for all of the update target ECUs (B4, YES), the specification data generation unit 201 designates rewriting environment information (B5). The rewriting environment information is used for the vehicle system 4 to perform the rewriting control and directly designates rewriting operations of the vehicle system 4. The rewriting environment information includes two types. A first type is rewriting environment information for the vehicle as a whole and a second type is rewriting environment information for an ECU group. For example, the rewriting environment information for the vehicle as a whole may include vehicle state information indicating whether the program update in the vehicle system 4 is permitted during the vehicle traveling (during the on state of the IG switch) or the program update in the vehicle system should be performed only during the parking (during the off state of the IG switch). The rewriting environment information may include battery level restriction information indicating in what battery level the program update in the vehicle system 4 is allowed. The rewriting environment information may include a bus load table information indicating in what bus load, the transfer of the writing data in the vehicle system 4 is allowed.

The rewriting environment information for the ECU group includes the ECUs 19 belonging to the group and the order of ECUs in the group. The vehicle system 4 controls program update so that the program update to a respective ECU group is made in the same timing while the writing to the ECUs in the group is performed in the designated order. The specification data generation unit 201 starts up a screen for registering the rewriting environment information and receives inputs from an OEM operator. Alternatively, Excel (registered trademark) in which the rewriting environment information is input may be imported. Alternatively, the restriction information registered in the configuration information DB 208 may be extracted. The specification data generation unit 201 uses the group information generated at B2 as the rewriting environment information for the ECU group.

In the example shown in FIG. 18, the first bus has an allowable transfer level of 80%, where the allowable transfer level is an allowable transfer amount divided by a maximum allowable transfer amount. When the power status is the IG power, the CGW 13 is allowed to transfer vehicle control data up to 50% transfer level and allowed to transfer the wiring data up to 30% transfer level. When the power status is the ACC power, the CGW 13 is allowed to transfer vehicle control data up to 30% transfer level and allowed to transfer the wiring data up to 50% transfer level. When the power status is the +B power, the CGW 13 is allowed to transfer vehicle control data up to 20% transfer level and allowed to transfer the wiring data up to 60% transfer level. Substantially the same applies to the second bus and the third bus.

At B6, the specification data generation unit 201 arranges the generated or acquired data in accordance with a predetermined data structure, thereby generating the rewriting specification data as shown in FIG. 17. That is, the specification data generation unit 201 generates the rewriting specification data having a data structure that is interpretable by the vehicle system 4. The ECU information for multiple ECU groups may be described in the rewriting specification data in the ascending order of the groups. The ECU information for multiple ECUs in a respective group may be described in the rewriting specification data in the specific order. Suppose that: the first ECU group consists of the ECU having the ECU ID=ADS; the second ECU group consists of the ECU having the ECU ID=BRK and the ECU having the ECU ID=EPS; and the ECU having the ECU ID=BRK has the first place in the ECU order in the second group and the ECU having the ECU ID=EPS has the second place in the ECU order in the second group. In this case, in the ECU information of the specification data, the ECU information of the ECU having the ECU ID=ADS is arranged in the first place (top), the ECU information of the ECU having the ECU ID=BRK is arranged in the second place (next to the ADS), the ECU information section of the ECU having the ECU ID=EPS is arranged in the end place (bottom).

In the specification data shown in FIG. 17, the data items of the ECU information from the ECU ID to the transfer size are examples of target device related information including the type of the target ECU 19 and correspond to the hardware attribute information and software attribute information described above. The data items from the update program version to the writing memory area are examples of update data related information. Further, the rewriting environment information for ECU group or for vehicle as a whole is an example of update process information which designates an update process in the vehicle.

Figure 19:
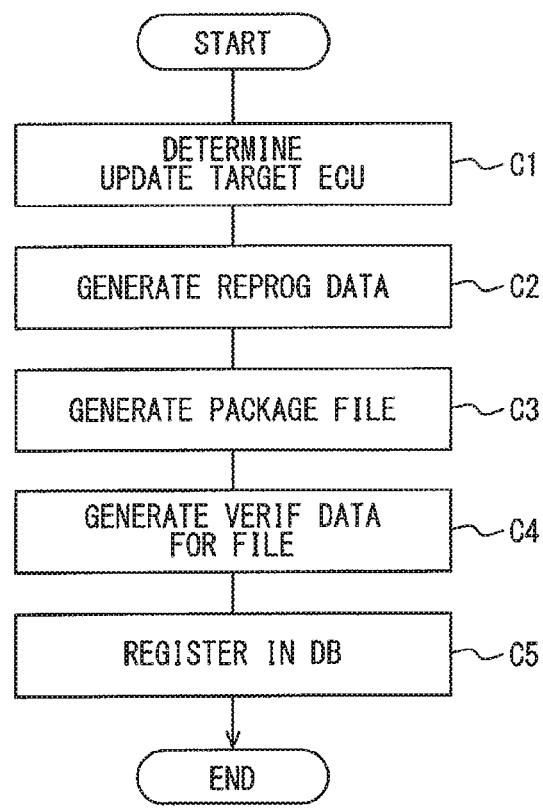
FIG. 19 is a flowchart illustrating processes for generating a distribution package registered in a package DB.

With reference to FIG. 19, package generation processes performed by the package generation unit 202 will be described. The processes for package generation for vehicles belonging to the vehicle type=aaa will be given by way of example. As shown in FIG. 19, the center apparatus 3 activates the package generation unit 202 of the package management section 3A in response to instructions from the operator. At C1, the package generation unit 202 determines the ECU SWIDs of the update target ECU in the same manner as in B1. At C2, the package generation unit 202 acquires the data corresponding to the ECU SWIDs of the respective update target ECUs from the ECU reprograming data DB 204 and generates a single reprogramming data. For example, in the case of FIG. 10, the package generation unit 202 acquires: the integrity verification data for the new program; the update data provided as the difference data; the integrity verification data for the update data; the integrity verification data for the old program; and the rollback data provided as the difference data. Then the package generation unit 202 generates the reprogramming data. At C3, the package generation unit 202 combines together the generated reprograming data and the corresponding rewriting specification data described in B1 to B6 to generate a single distribution package file. Next, at C4, the package generation unit 202 generates the integrity verification data for the generated package file and at C5 registers the package file and the integrity verification data in the package DB 206.

Figure 20:
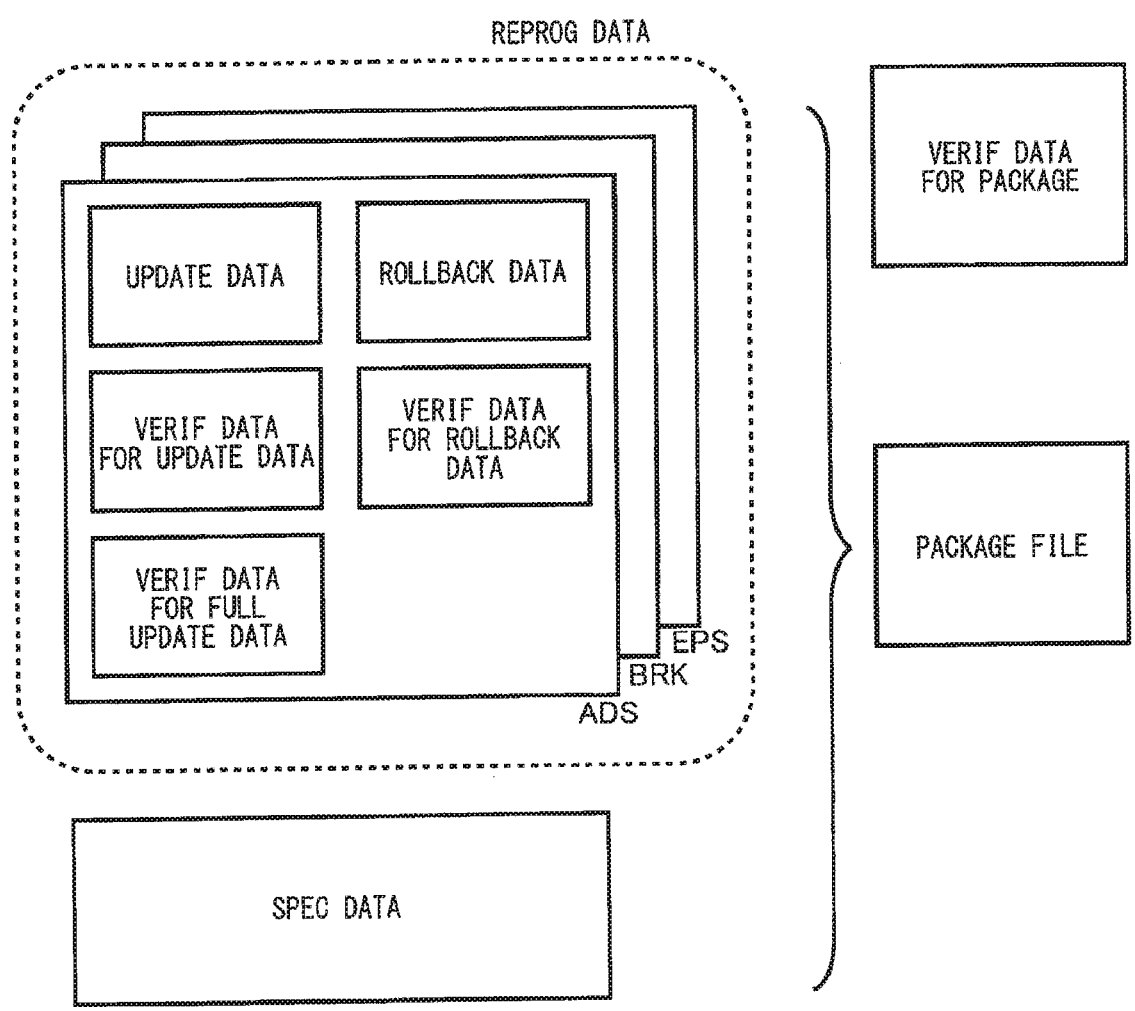
FIG. 20 is diagram schematically illustrating data contents of a package file.

The package file generated in this manner is schematically illustrated in FIG. 20. FIG. 20 illustrates that three sets of the update data and the integrity verification data for the respective three update target ECUs having the ECU ID=ADS, the ECU ID=BRK and the ECU ID=EPS are integrated into the single reprograming data according to the specific ECU order, and the rewriting specification data is further combined with the single reprograming data, thereby generating a single distribution package file. The rollback data may be included in the reprogramming data for only the update target ECU 19 that has the single memory area configuration. For the ECU having the two memory area configuration or the suspend configuration, the rollback data is omittable because the rewriting to the in-use memory area is not performed.

In the above system, the ECU reprograming data DB 204 of the center apparatus 3 contains the update program data for the update target ECU(s) 19 among the ECUs 19 mounted in the vehicle. The configuration information DB 208 contains the vehicle-related information in association with the vehicle model. The vehicle-related information contains the ECU IDs of the respective ECUs 19 mounted in the vehicle and the ECU SWIDs associated with the application programs of the respective ECUs. The ECU metadata DB 205 contains the update data related information, which relates to the attribute of the rewrite target ECU 19 and the update data.

Based on the information stored in the configuration information DB 208 and the ECU metadata DB 205, the specification data generation unit 201 generates the specification data which is to be sent to the vehicle together with the update data for the target update ECU. The generated specification data contains the type and attribute of update target ECU, the update data related information, and the information indicating rewriting environment for data updating. Furthermore, the package generation unit 202 generates a distribution package containing the specification data and the reprogramming data, and registers the generated distribution package in the package DB 206. Then, the package distribution unit 203 distributes the registered distribution package to the vehicle system 4. Thus, the vehicle system 4 receives the specification data together with the update data. This makes it possible for the vehicle system 4 to appropriately select the update target ECU 19 based on the specification data and appropriately control the writing process using the update data.

The specification data generation unit 201 generates the specification data for a plurality of ECUs 19 as a single file, and the package generation unit 202 packages the data together with the reprogramming data for a plurality of ECUs 19 into a single file. Therefore, the vehicle system 4 can write the update data to icy a plurality of ECUs 19 by receiving the single distribution package.

Further, since the vehicle-related information serving as the specification data includes the group information obtained via grouping part of the plurality of ECUs 19, the vehicle system 4 can select the rewrite target ECU 19 according to the order defined in the group information, and can write the update data in this order. For example, when there are a number of ECUs 19 targeted for certain function improvements, it is possible to set the first group to the body system ECU(s) 19, the second group to the traveling system ECU(s) 19 and the third group to the multimedia system ECU(s) 19, whereby the vehicle system 4 can separately perform the program updates to the three groups. Therefore, the user's waiting time for update to each group can be shortened as compared to the case where the program update is executed collectively for all the ECUs.

Further, since the rewriting environment information includes the vehicle state (IG on state), the battery load and the bus load table, the vehicle system 4 uses this information to determine the timing of writing the update data and the like. Specifically, the OEM or the service provider using the center apparatus 3 can implement flexible program updates by specifying, as the rewriting environment information, the constraint condition for constraining vehicle update execution.

In addition, since the specification data generation unit 201 generates, in accordance with a predetermined data structure, the multiple sets of specification data for multiple ECUs in the predetermined rewriting order from that for the ECU 19 placed in the earliest rewrite place, the vehicle system 4 can perform the ECU rewriting operations to the multiple ECUs in the order designated in the specification data. For example, when the ECUs 19 having a cooperative operation are put into a group and the order of ECUs is defined in consideration of contents of the cooperative operation, even if the timings of updating new programs are not completely synchronized in the vehicle system 4, the vehicle system 4 may complete the program updates without some troubles. For example, it is assumed that: the new program of the ECU having ID1 has a process of transmitting a predetermined message to the ECU having ID2; and the new program of the ECU having ID2 has a process that times out when failing to receive the predetermined message transmitted from the ECU having ID1, In his case, it is preferable to define the ECU order so that the ECU having the ID1 should be updated first and the ECU (102) should be updated later.

Figure 21:
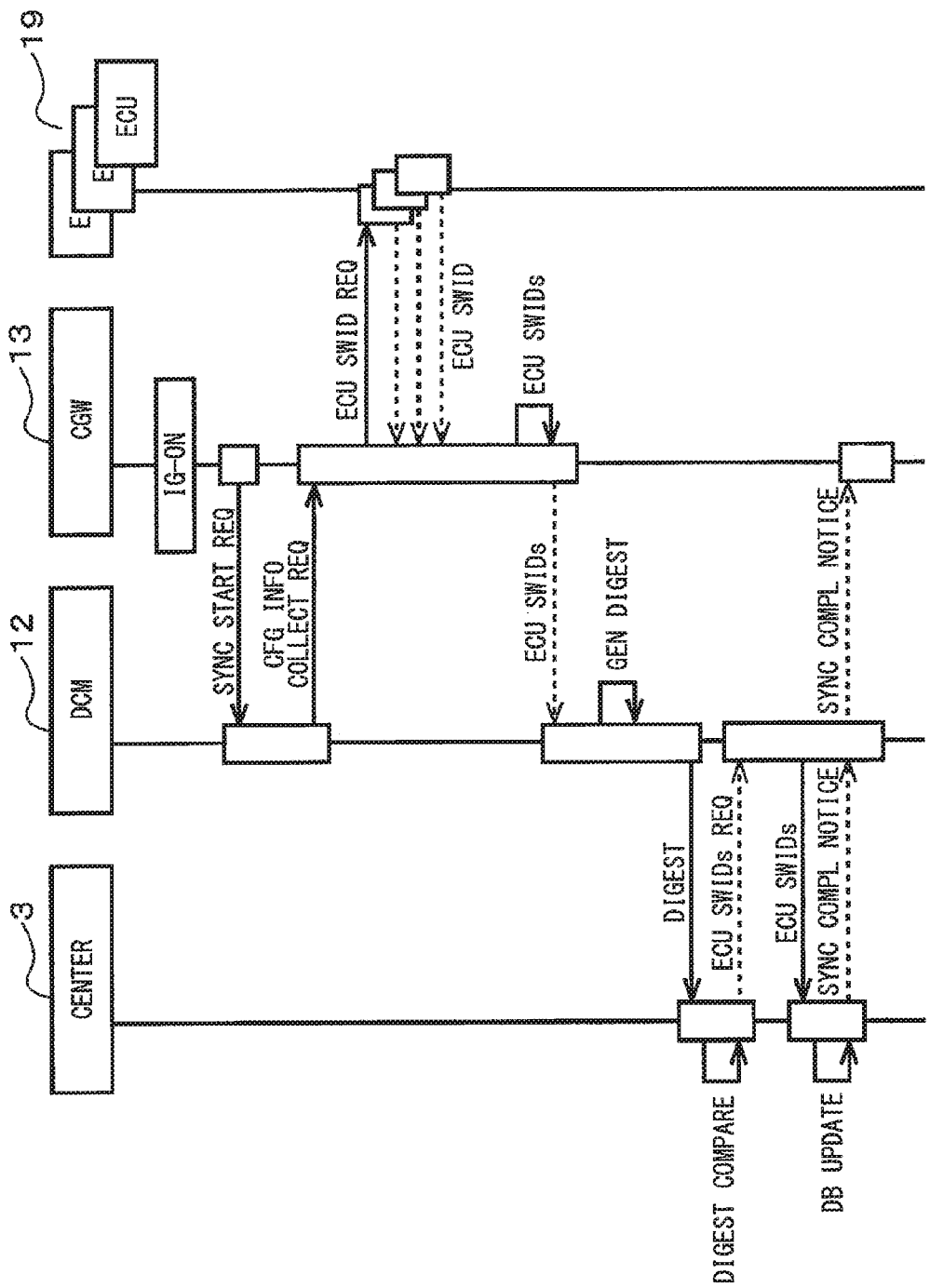
FIG. 21 is a sequence diagram illustrating processes performed by a center apparatus and a vehicle system interactively.

Now, with reference to FIG. 21, processes relating to synchronization between the individual vehicle information DB 213 and the actual current vehicle configuration will be described. In response to turn on of the IG switch 37 of the vehicle, the CGW 13 sends a synchronization start request to the DCM 12. In response, the DCM 12 sends a configuration information collection request to the CGW 13. Then, the CGW 13 inquires each ECU 19 about its program version. Specifically, the CGW 13 inquires each ECU 19 about its ECU SWID. Each of the ECUs 19 sends back its ECU SWID to the CGW 13. At this time, the ECU 19 that has the two memory area configuration or the suspend memory configuration further sends the memory area information to the CGW 13 indicating which of the memory areas is the in-use memory area and which of the memory areas is the out-of-use memory area. Furthermore, each of the ECUs 19 may send to the CGW 13 calibration information on its control target actuator or the like and, if any, a trouble code generated in the ECU 19.

When the CGW 13 receives the ECU SWIDs from the respective ECUs 19, the CGW 13 sends the ECU SWIDs to DCM 12 together with the VIN. At this time, the CGW 13 may send license information for receiving Over-the-Air program update service, the vehicle SWID and the Sys IDs to the DCM 12. The above license information, the vehicle SWID and the Sys IDs are managed by the CGW 13, specifically stored in the flash memory 24d of the CGW 13. Further, the CGW 13 may send the calibration information and the trouble code to the DCM 12. In response to receipt of the above data sent from the CGW 13, the DCM 12 generates a digest value. For example, as the digest vehicle, the DCM icy 12 generates a single hash value based on all the ECU SWIDs by using SHA-256 as a hash function in the following manner. The DCM 12 serially connects all of the received ECU SWIDs to obtain a single data value and divides the single data value into message blocks each having 64 bytes long. The DCM 12 applies the first message block to an initial hash value (e.g., random number) to obtain a first hash value of 32 bytes long and applies the second message block to the first hash value to obtain a second hash value of 32 bytes long. Then, the DCM 12 successively applies the next message block to an obtain hash value, and finally obtain a 32 bytes long hash value of the serially connected ECU SWIDs.

Together with the VIN, the DCM 12 sends the digest value (hash value) of the ECU SWIDs obtained in the above manner to the center apparatus 3. Further, the DCM 12 may send the trouble code and the license information together with the digest value. Hereinafter, the digest value may be referred to as a configuration information digest. All of the data values used as the basis for the digest value may be referred to as whole configuration information or data values of vehicle configuration information. The whole configuration information may further include one or more or all of the vehicle SWID, the Sys IDs, the memory area information, and the calibration information. That is, the DCM 12 may generate the hash value based not only on the ECU SWIDs but also on one or some or all of the vehicle SWID, the Sys IDs, the memory area information, and the calibration information.

The center apparatus 3 updates the individual vehicle information DB 213 to synchronize the individual vehicle configuration information registered in the individual vehicle information DB 213 with the actual current vehicle configuration. As described later in more details, the center apparatus 3 make comparison between digest values (hash values) to determine whether to update the individual vehicle information DB 213. The center apparatus 3 checks whether the program update exists for the vehicle. When the program update exists for the vehicle, the center apparatus 3 notifies the vehicle system 4 of the campaign information indicating that the update is available. Thereafter, the vehicle system 4 downloads the distribution package, performs software installation to the update target ECU 19, and activates the new program. In response to the completion of the update processing including installing and activating the program, the CGW 13 sends a synchronization start request to the DCM 12 again to perform the same processing as described above and receives a synchronization completion notification. In the above illustration, the above processing is performed in response to the turn on of the IG switch 37. Additionally or alternatively, the processing may be performed in response to completion of the program update.

Figure 22A:
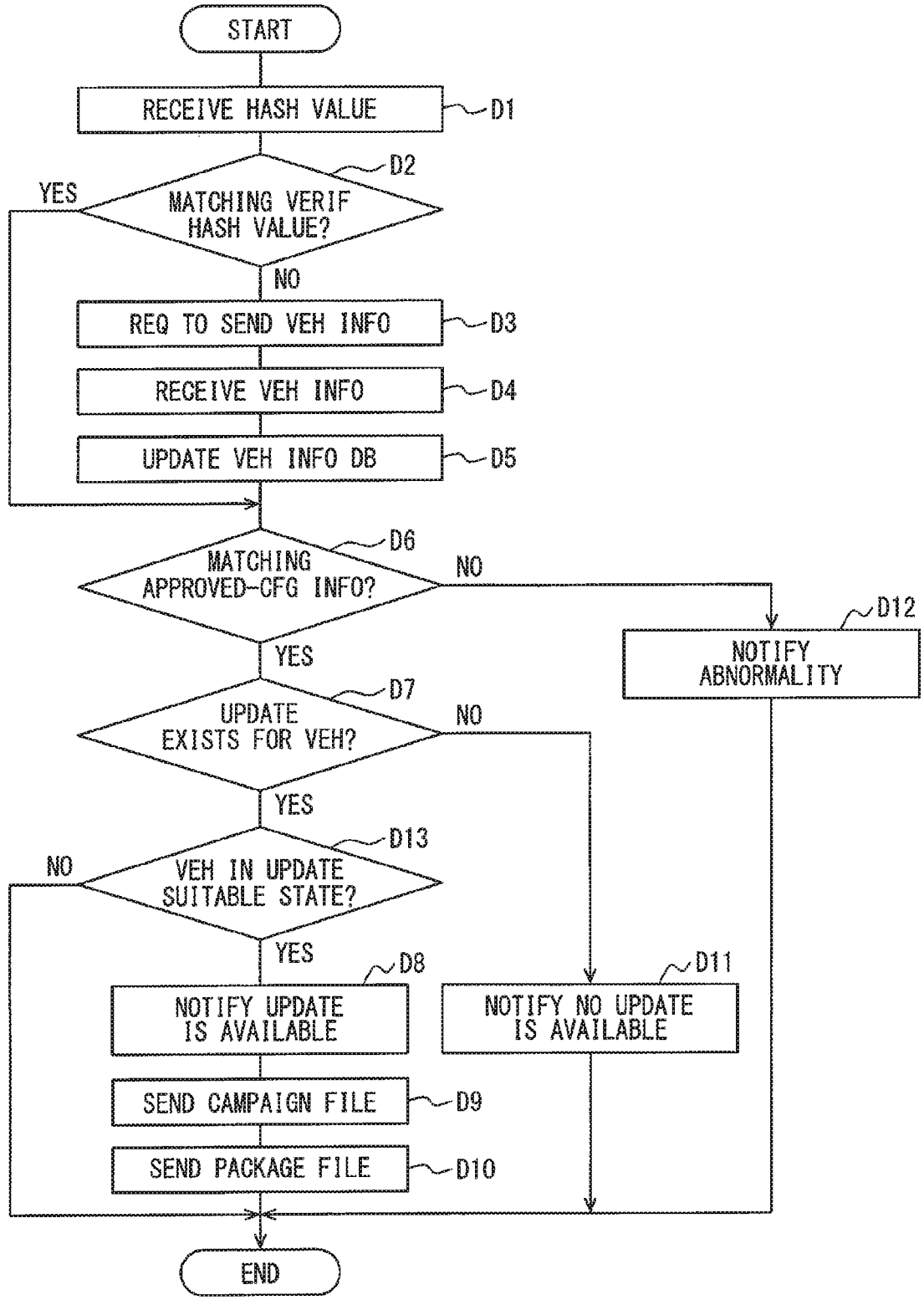
FIG. 22A is a flowchart illustrating processes performed by a center apparatus.
Figure 22B:
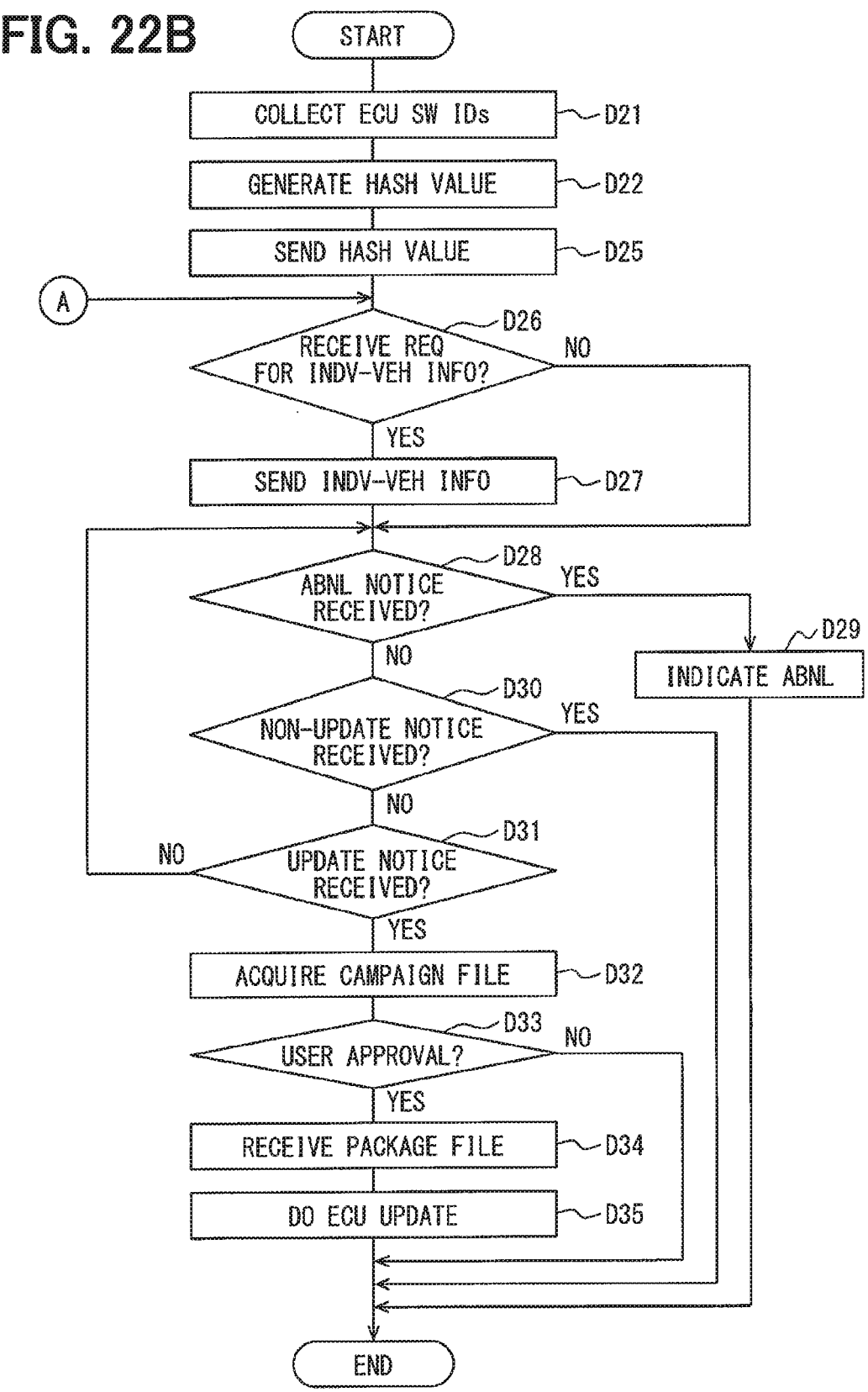
FIG. 22B is a flowchart illustrating processes performed by a vehicle system.

Next, with reference to FIG. 22A and FIG. 22B, the above described processes performed cooperatively by the center apparatus 3 and the vehicle system 4 will be more specifically described. FIG. 22A is a flowchart illustrating processes performed by the center apparatus 3 (specifically the center computer 310) and the FIG. 22B is a flowchart illustrating processes performed by the vehicle system 4 (specifically the master device 11).

The master device 11 of the vehicle system 4 starts the processes of FIG. 22B at a predetermined timing. The predetermined timing is, for example, the timing of turning on the IG switch 37.

At D21, the master device 11 collects data values of the vehicle configuration information including the ECU SWIDs of respective ECUs 19, For example, when the IG switch 37 is turned on, the master device 11 requests each ECU to send its ECU SWID and receives the ECU SWIDs from the ECUs in response to the request. Thereby, the master device 11 collects the ECU SWIDs. At this time, the calibration information of a control target actuator or the like is sent to the master device 11 from each ECU 19. If a double code indicating abnormality in the ECU 19 is present in the ECU 19, the trouble code is also sent to the master device 11. Further, the master device 11 reads out the vehicle SWID and the Sys IDs from the flash memory 24d. The master device 11 stores the data acquired as described above in the RAM 24c as the data values of the vehicle configuration information.

At D22, the master device 11 generates a single hash value based on the vehicle configuration information collected at D21. Specifically, the hash value is generated based at least on the ECU SWIDs of the ECUs 19 collected at D21. In the present disclosure, the hash value generated by the master device 11 is also referred to as a vehicle generated hash value. The method described above is employable as a method of generating the vehicle generated hash value.

At D25, the master device 11 sends the vehicle generated hash value together with the VIN to the center apparatus 3 via the wireless communications. At this time, the master device 11 sends the license information stored in the flash memory 24d to the center apparatus 3 together with the vehicle generated hash value. If the trouble code is acquired in D21, the trouble code is also sent to the center apparatus.

In response to the master device 11 sending the vehicle generated hash value, the VIN etc. to the center apparatus 3 at D25, the processes performed by the center computer 310 shown in FIG. 22A is started.

As shown in FIG. 22A, at D1, the center computer 310 (specifically, the individual vehicle information management unit 3C) receives the vehicle generated hash value and the VIN etc. via the center communicator 330.

At D2, the center computer 310 acquires, by using the received VIN, the verification hash value of the vehicle registered in the individual vehicle information DB 213 and determines whether the vehicle generated hash value matches the verification hash value. The verification hash value is, as described above, a hash value generated by the center computer 310 based at least on the ECU SWIDs registered in the individual vehicle information DB 213. The verification hash value may be generated and registered in the individual vehicle information DB 213 prior to D21, or may be generated upon receipt of the vehicle generated hash value from the vehicle system 4 at D21. If it is determined in D2 that the vehicle generated hash value and the verification hash value do not match each other, the process proceeds to D3.

At D3, the center computer 310 sends a full data sending request to the vehicle system 4 via the wireless communications by using the center communicator 330. This full data sending request requests that the vehicle configuration information (the whole configuration information) including the ECU SWIDs of the ECUs 19, the vehicle SWID and the Sys IDs be sent to the center apparatus 3.

Upon the master device 11 receiving the full data sending request (YES at D26 in FIG. 22B), the master device 11 sends the vehicle configuration information stored in the RAM 24c and the VIN to the center apparatus 3 using the DCM 12 via the wireless communications at D27.

In response to this, the center computer 310 receives the vehicle configuration information and the VIN via the center communicator 330 at D4, as shown in FIG. 22A, At D5, the center computer 310 (specifically, the individual vehicle information management unit 3C) updates the individual vehicle configuration information of the vehicle registered in the individual vehicle information DB 213 that matches the received VIN. More specifically, the individual vehicle configuration information (the vehicle information entry) registered in the individual vehicle information DB 213 in association with the received VIN is rewritten with the received vehicle configuration information including the ECU SWIDs, the vehicle SWID, the Sys IDs, the memory area information, and the calibration information. Upon completion of D5, the process proceeds to D6.

The process also proceeds to D6 upon determining at D2 that the vehicle generated hash value and the verification hash value match each other. This is because there is a possibility that the individual vehicle information DB 213 has been updated.

At D6, the center computer 310 (specifically, the configuration information check unit 210) determines whether the vehicle information entry of the vehicle registered in the individual vehicle information DB 213, that is, the vehicle configuration information wirelessly received from the vehicle, matches the approved configuration information registered in the configuration information DB 208 in association with the vehicle model of the vehicle.

For example, at D6, based on the VIN received at 01, the center computer 310 searches the configuration information DB 208 for the approved configuration information associated with the vehicle model of the vehicle from among the approved configuration information associated with multiple vehicle models. The center computer 310 determines whether all of the vehicle SWID and the ECU SWIDs in the vehicle configuration information wirelessly sent from the vehicle are included in any one of approved combinations in the approved configuration information associated with the vehicle model of the vehicle registered in the configuration information DB 208. A respective approved combination is a combination of the vehicle SWID and ECU SWIDs, which combination is registered by the OEM of the vehicle as being approved for use in the market.

Figure 23A:
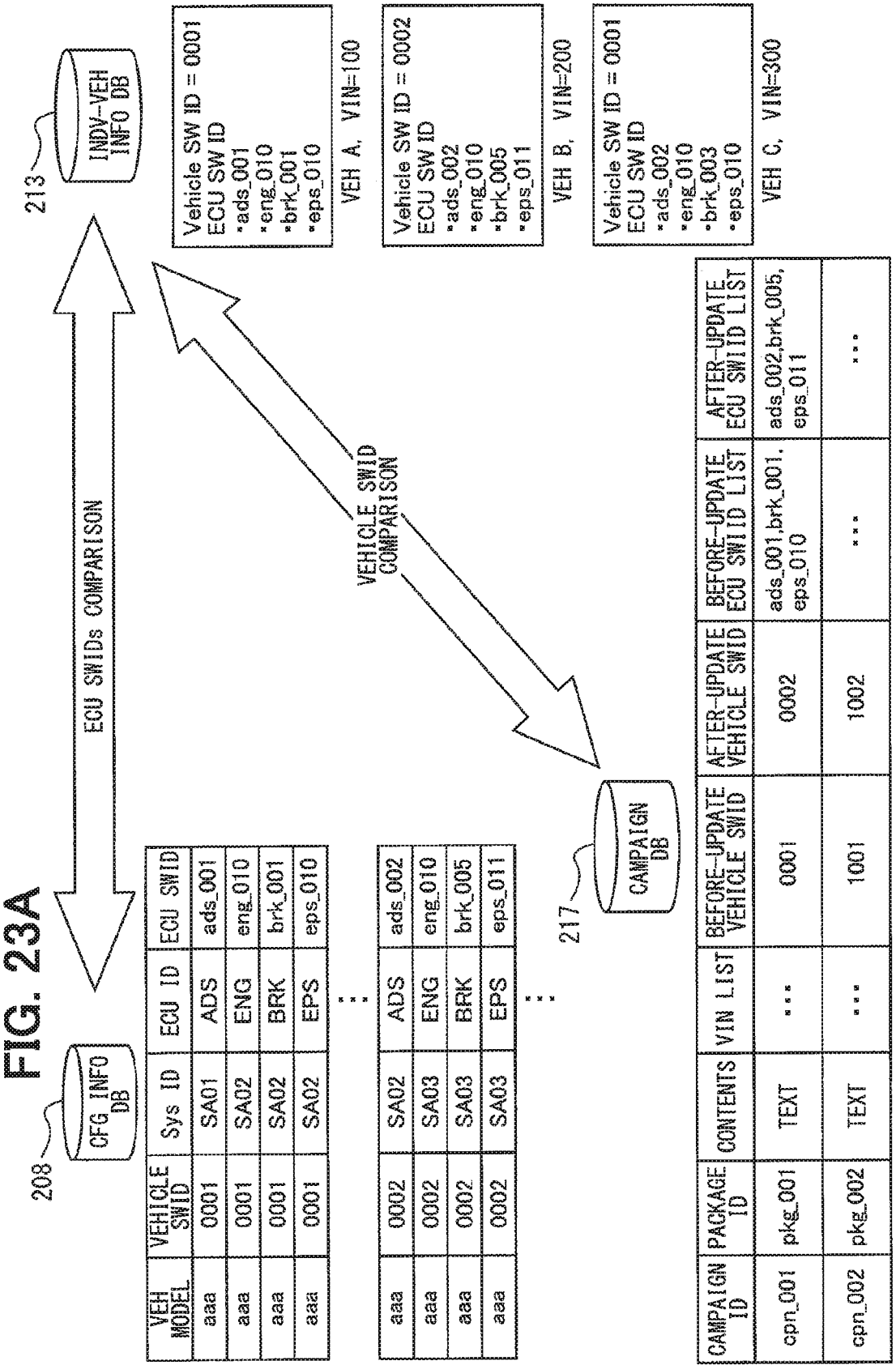
FIG. 23A is a diagram schematically illustrating processes relating to D6 and D7 of FIG. 22A.

In the case illustrated in FIG. 23A, the configuration information DB 208 contains two approved combinations each associated with the vehicle model=aaa, A first approved combination has: the vehicle SWID=0001; the ECU SWID=ads_001 for the ECU ID=ADS; the ECU SWID=eng_010 for the ECU ID=ENG; the ECU SWID=brk_001 for the ECU ID=BRK; and the ECU SWID=eps_010 for the ECU ID=EPS. A second approved combination has; the vehicle SWID=0002; the ECU SWID=ads_002 for the ECU ID=ADS; the ECU SWID=eng_010 for the ECU ID=ENG; the ECU SWID=brk_005 for the ECU ID=BRK; and the ECU SWID=eps_011 for the ECU ID=EPS.

In the case illustrated in FIG. 23A, the vehicle C having the VIN=300 belonging to the vehicle model=aaa has the vehicle SWID=0001, the ECU SWID=ads_002 for the ECU ID=ADS, the ECU SWID=eng_010 for the ECU ID=ENG; the ECU SWID=brk_003 for the ECU ID=BRK; and the ECU SWID=eps_010 for the ECU ID=EPS. Thus, none of the first and second approved combinations include all of the vehicle SWID and the ECU SWIDs of the vehicle C. This is because the vehicle C differs from the first approved combination in the ECU SWIDs of the two ECUs corresponding to the ECU ID=ADS and the ECU ID=BRK and because the vehicle C differs from the second approved combination in at least the vehicle SWID. Accordingly, the determination result at D6 is false in this case.

When the determination at D6 is false (NO at D6), the process proceeds to D12, At D12, the center computer 310 (the configuration information check unit 210) notify a management device 220 about abnormality, where the management device 220 is a device managed by the OEM of the vehicle for management of information on their vehicles. Alternatively or additionally, the center computer 310 may notify the vehicle system 11 about the abnormality using the center communicator 330. Upon receipt of the abnormality notification (D28: YES), the master device 11 may indicate, for example on the vehicle display 7, that the vehicle is in such an abnormal state that normal vehicle operations may not be ensured (D29). It is noted in connection with D6 that even if there is no new program available for two ECUs 19 (for example, ECU ID=ADS and ECU ID=BRK), when the ECU SWIDs of these two ECUs are out of the approved combination, the vehicle is considered to be non-approved and the process after D6 is not be performed.

Let us consider the vehicle A having VIN=100 illustrated in FIG. 23A. The vehicle A has the vehicle SWID=0001, the ECU SWID=ads_001 for the ECU ID=ADS, the ECU SWID=eng_010 for the ECU ID=ENG, the ECU SWID=brk_001 for the ECU ID=BRK, and the ECU SWID=eps_010 for the ECU ID=EPS. In this case, all of the vehicle SWID and the ECU SWIDs of the vehicle A are included in the first approved combination. Accordingly, the determination at D6 is true (YES at D6) and the process proceeds to D7. In the above description, it is determined at D6 whether all of the vehicle SWID and the ECU SWIDs sent from the vehicle are included in any of the approved combinations registered in the configuration information DB 208 in association with the vehicle mode of the vehicle. Alternatively, it may be determined at D6 whether all of the ECU SWIDs sent from the vehicle are included in any of the approved combinations registered in the configuration information DB 208 in association with the vehicle mode of the vehicle. The determination at D6 may be performed for each group of ECUs. For example, the determination at D6 may be performed for the group of body ECUs 19, and further performed for the group of traveling ECUs 19, and further performed for the group of multimedia ECUs 19. Specifically, for each group of ECUs, it may be determined at D6 whether the ECU SWIDs of the group of ECUs in the vehicle configuration information received from the vehicle match any of the approved ECU-SWID combinations for the group of ECUs registered in the configuration information DB 208 in association with the vehicle mode of the vehicle.

More specifically, for each group of ECUs, it may be determined at D6 whether all of the ECU SWIDs of the group of ECUs in the vehicle configuration information received from the vehicle are included in any of the approved ECU-SWID combinations for the group of ECUs registered in the configuration information DB 208 in association with the vehicle mode of the vehicle. Alternatively, it may be determined at D6 whether all of the vehicle SWID, the Sys IDs and the ECU SWIDs are included in any of the approved combinations registered in the configuration information DB 208 in association with the vehicle mode of the vehicle.

In any of the above manners, the center computer 310 determines whether all of the ECU SWIDs received from the vehicle are included in a particular ECU SWID combination among a plurality of ECU SWID combinations registered in the approved-configuration DB, the particular ECU SWID combination corresponding to the vehicle model of the vehicle. The particular ECU SWID combination may be one or more ECU SWID combinations. In the above, in order to perform the determination at D6 for each group of ECUs, the center computer 310 may use the Sys IDs in addition to or instead of using the ECU SWIDs of the group of ECUs.

The approved ECU SWID combinations may be combinations each approved for use in the market, as described above. Specifically, each of the approved ECU SWID combinations may be a combination that is determined by the OEM of the vehicle to be such a combination that the ECUs 19 are cooperatively operable properly and then registered in the configuration information DB 208 by the OEM. In determining whether the ECUs 19 are cooperatively operable properly, the OEM may request a third party authentication authority or the like for approval and receive third party approval. In the case where an approved combination that further includes a vehicle SWID and/or the Sys IDs is used in the determination at D6 also, the approved combination of may be a combination of these IDs that is determined by the OEM of the vehicle to be such a combination that the vehicle including the ECUs 19 is operable properly and then registered in the configuration information DB 208 by the OEM. The configuration information DB 208 is an example of approved configuration database.

At D7, the center computer 310 accesses the campaign DB 217 and determines whether software update data exists for at least one of the ECUs 19 mounted in the vehicle from which the hash value is received at D1. In other words, the center computer 310 determines whether update data exists for the combination of the ECU SWIDs of the ECUs 19 mounted in the vehicle from which the hash value is received at D1. The determination at D7 may be performed for each group of ECUs 19. For example, the determination at D7 may be performed for the group of body ECUs 19, and further performed for the group of traveling ECUs 19, and further performed for the group of multimedia ECUs 19. Specifically, for each group of ECUs, it may be determined at D7 whether software update data exists for at least one ECU of the group of ECUs mounted in the vehicle.

For example, the center computer 310 (update presence/absence check unit 211) accesses the campaign DB 217 via the campaign management unit 3D, and checks whether update due to new program(s) is available. The center computer 310 determines the presence or absence of the available update through comparing the vehicle SWID uploaded from the vehicle system 4 with a before-updated vehicle SWID registered in the campaign DB 217 in association with an after-update vehicle SWID. The before-updated vehicle SWID indicates a vehicle SWID of the vehicle that is available to this update. The after-update vehicle SWID indicates a vehicle SWID that the vehicle will have after performing the update. For example, in the case of FIG. 23A, since the before-update vehicle SWID 0001 is associated with an update available VIN list that includes the VIN=100 of the vehicle A, the determination of D7 is true (YES at D7).

After the center computer 310 determines that the update data exists for at least one of the ECUs 19 by comparing between the vehicle SWID uploaded from the vehicle system 4 and the before-update vehicle SWID registered in the campaign DB 217, the center computer 310 identifies, for D13, which one(s) of the ECUs 19 is to be updated with the update data. This identification may be made, for example, by comparing an before-update ECU SWID list registered in the campaign DB 217 with an after-update ECU SWID list registered in the campaign DB 217 (see FIGS. 14 and 23A). The before-update ECU SWID list is a list of ECU SWIDs of the ECUs 19 before this software update is made in the vehicle. The after-update ECU SWID list is a list of the ECU SWIDs of the ECUs 19 after this software update is made in the vehicle.

At D13, the center computer 310 determines whether the vehicle is in an update suitable state, based on at least one of the trouble code indicating ECU abnormality or the license information indicating an OTA update license agreement. For example, let us assume that the trouble code received together with the hash value at D1 indicates that, among the ECUs 19, there is abnormality in a specific ECU. In this case, the center computer 310 determine that the vehicle is in the update suitable state when the update for the specific ECU is not included in the update for the at least one of the ECUs. In other words, the center computer 310 determines that the vehicle is in the update suitable state when the trouble code does not indicate ECU abnormality in any of the ECUs 19 for which the software update data is determined to exist. Alternatively, the center computer 310 may determine that the vehicle is not in the update suitable state, regardless of whether the update for the specific ECU is not included in the update for the at least one of the ECUs 19. In other words, the center computer 310 may determine that the vehicle is not in the update suitable state when the trouble code indicates ECU abnormality in any of the ECUs 19

Further, the center computer 310 determines that the vehicle is in the update suitable state, on condition that OTA update license agreement is valid. Whether or not the license agreement is valid is determined using the license information received together with the hash value at D1.

When it is determined in D13 that the vehicle is in the update suitable state, the process proceeds to D8.

At D8, the center computer 310 notifies the vehicle system 4 that the ECU software update is available. Specifically, the center computer 310 (update presence/absence check unit 211) sends the corresponding campaign ID=Cpn_00 to the vehicle system 4 of the vehicle by using the center communicator 330. The campaign information corresponds to update notification information. The campaign DB 217 is an example of the update notification information storage.

A before-update Sys ID list and an after-update Sys ID list may be registered in the campaign DB 217. In this case, the center computer 310 may determine based on the Sys ID list whether the available software update exists. Instead of using the before-update vehicle SWID and the after-update vehicle SWID, the center computer 310 may compare the ECU SWID list uploaded from the vehicle with the before-update ECU SWID list registered in the campaign DB 217 to determine whether the available software update exists.

When the campaign ID is notified to the vehicle system 4 at D8, the master device 11 receives this campaign notification via the DCM 12 (YES at D31). The master device 11 acquires a campaign file corresponding to the campaign ID from the center apparatus 3 using the notified campaign ID as a key (D9). Via the wireless communications, the center computer 310 sends the campaign file from the center communicator 330 to the vehicle system 4 in response to a campaign file acquisition request from the vehicle system 4 (D32). The campaign file contains texts describing the contents of the campaign, restrictions when executing program update, and the like.

The restrictions include conditions for executing the download and/or installation of the update data. For example, the restrictions include a remaining battery level, a free space of the RAM necessary for downloading the distribution package, the current position of the vehicle, and the like. The master device 11 analyzes the campaign file, and displays the contents of the campaign and the like using the vehicle display 7. The user refers to messages displayed on the in-vehicle display 7 according to the content of the campaign, and determines whether to update the application program(s) of the ECU(s) 19. When the user inputs an update approval via the in-vehicle display 7 (YES at D33), the master device 11 (specifically, the CGW 13) notifies the center apparatus 3 about the user update approval via the DCM 12. When the center computer 310 receives the update approval, the center computer 310 sends the distribution package file having the package ID corresponding to the campaign ID to the vehicle system 4 together with the integrity verification data (D10). That is, at D10, the center computer 310 distributes the ECU update data from the center communicator 330 to the vehicle system 4. When the master device 11 receives the update data (distribution package file and the integrity verification data) via the DCM 12 (D34), the master device 11 updates the ECU(s) 19 that is to be updated with the update data (D35).

When the center computer 310 determines that the update available does not exist (D7, NO), the center computer 310 notifies the vehicle system 4 that no update is available (D11). When the master device 11 receives the no update notification via the DCM 12 (D30: YES), the processing shown in FIG. 22A and FIG. 22B is ended. For example, in the case of FIG. 23A, the vehicle B with VIN=200 has the vehicle SWID=0002 and no campaign exists for the before-update vehicle SW ID=0002 in the campaign DB 217, the center computer 310 determines no update is available for the vehicle A and notifies the vehicle A that no update is available.

The timing of sending the synchronization start request from the CGW 13 may be a timing of the turn on or off of the IG switch 37 or the like. Alternatively or additionally, the timing of sending the synchronization start request may be a timing of completing the data rewriting to the ECU(s) 19 based on the update data distributed from the center apparatus 3. Preferably, the synchronization start request may be sent when the IG switch 37 is turned on and further when the data rewriting to all of the update target ECU(s) 19 is completed.

In the above description, upon receiving the full data sending request (at predetermined timing), the master device 11 wirelessly sends the vehicle configuration information including the ECU SWIDs of the ECUs 19 mounted in its vehicle to the center apparatus 3 by using the DCM 12. However, the timing of the master device 11 sending the vehicle configuration information is not limited to this example. For example, the master device 11 may be configured to wirelessly send the vehicle configuration information to the center apparatus 3 upon elapse of a predetermined time (e.g., a few months) since the previous sending of the vehicle configuration information to the center apparatus 3.

The center computer 310 may be configured to, when the determination at D6 in FIG. 22A is false (NO at D6), send a message to the master device 11 to indicate that Over-The-Air (OTA) software update is prohibited for all of the ECUs 19 mounted in the vehicle due to the vehicle having a non-approved combination icy of the ECU SWIDs and/or the Vehicle SWID and/or the Sys IDs.

At D8, in addition to or in place of notifying the vehicle system 4 that a software update is available by, for example, sending the campaign ID, the center computer 310 may notify the portable terminal 6 that the software update is available. In this case, the processing prior to the sending of the distribution package file and the integrity verification data from the center apparatus 3 to the vehicle system 4 may be as follows. The portable terminal 6 having received the campaign ID acquires a campaign file from the center apparatus 3 (D32). Then, when the user refers to the contents of the campaign file and inputs the update approval via the HMI of the portable terminal 6 (YES at D33), the portable terminal 6 notifies the center apparatus 3 about the update approval. Then, the center computer 310 sends the distribution package file and the integrity verification data to the vehicle system 4 (010).

In the above, the ECU SWIDs of the respective ECUs 19 are contained in the individual vehicle configuration information. In this regard, these ECUs 19 may include a first ECU(s) configured to receive the software update data via the wireless communications from the center apparatus 3 and a second ECU(s) configured to receive software update data via wired communications from the outside of the vehicle (e.g., tool 23). Specifically, the second ECU is updatable with the tool 23 but it is supposed that the software update data for the second ECU is not provided from the center apparatus 3 to the vehicle system 4 via the wireless communications. Thus, the ECU SWIDs of the ECUs 19 to be compared with the approved combinations by the center computer 310 at D6 may include the ECU SWID(s) of both the first ECU(s) and the second ECU(s).

In the above system, the vehicle system 4 collects the vehicle information including the ECU SWIDs by receiving the EC SWIDs from the respective ECUs 19, generates a hash value based on the data values of the collected vehicle information and sends the generated hash value to the center apparatus 3. The center apparatus 3 includes the individual vehicle information DB 213, and compares the hash value sent from the vehicle system 4 with the verification hash value generated based on the individual vehicle information registered in association with the VIN of that vehicle in the individual vehicle information DB 213. Then, when these hash values do not match each other, the center apparatus 3 requests the vehicle system 4 to send the whole configuration information. Then, the vehicle system 4 sends the whole configuration information to the center apparatus 3. When the center apparatus 3 receives the whole configuration information, the center apparatus 3 updates the individual vehicle information of the vehicle in the individual vehicle configuration information DB 213 with the received whole vehicle configuration information.

According to the above manner, the vehicle system 4 first sends the hash value to the center apparatus 3. Then, only when it is determined by the center apparatus 3 that the received hash value does not match the verification hash value, the vehicle system 4 sends the whole configuration information to the center apparatus 3. As a result, the amount of data sent from the vehicle system 4 is reducible, and therefore, even if there are a large number of vehicles each equipped with the vehicle system 4, a total amount of data sent from these vehicles is reducible. If the vehicle system 4 is configured to upload the whole configuration information at a predetermined timing such as turn on of the IG switch, communication traffic may concentrate at a certain time period of the day. In view of this, the hash value is used to reduce the amount of data sent from the vehicles, thereby reducing communication loads.

The CGW 13 receives the vehicle information such as the ECU SWIDs from the ECUs 19 each having the installed software and generates the hash value based on all of these data values. The DCM 12 sends the hash value to the center apparatus 3 at the timing of the turns on or off of the ignition switch 37 of the vehicle. Accordingly, it is possible to send the hash value at the timing of starting or ending the traveling of the vehicle. Therefore, the center apparatus 3 can properly synchronize the individual vehicle information in the individual vehicle information DB 213 with the actual vehicle configuration.

The master device 11 wirelessly sends the vehicle information including the ECU SWIDs of the ECUs 19 mounted in the vehicle from the DCM 12 to the center apparatus 3 at the predetermined timing (D27). When the center computer 310 determines that all the ECU SWIDs of the ECUs 19 received from the master device 11 are included in any of the approved combinations and that the update data exists for at least one of the ECUs 19 (YES in D6 and YES in D7), the center computer 310 wirelessly sends the update data to the vehicle system 4 (D10). Based on the distributed update data, the master device 11 performs the ECU software update. Therefore, even when the update data is the update data for only one or some of the ECUs, the distribution of this update data to the vehicle system 4 is performed on condition that all of the ECU SWIDs of the ECUs sent from the vehicle are included in any of the approved combinations registered in the configuration information DB 208, Therefore, under an appropriate vehicle environment, the ECU software update in the vehicle system 4 is performable with the wirelessly distributed update data. The OTA software update is performable appropriately.

The vehicle system 4 receives the ECU SWIDs from the respective ECUs 19 and sends a list of these ECU SWIDs to the center apparatus 3. The center apparatus 3 compares the ECU SWID list sent from the vehicle system 4 with the approved ECU SWID combination(s) corresponding to the vehicle model of the vehicle registered in the configuration information DB 208, When the center apparatus 3 determines that the ECU SWID list sent from the vehicle system 4 is non-approved, the center apparatus 3 sends this abnormality detection to the vehicle system 4 and/or the management device 220.

This enables the center apparatus 3 to detect such vehicle abnormality that the ECUs 19 may not cooperate properly and the normal traveling of the vehicle is not ensured due to the vehicle having the non-approved combination and enables the center apparatus 3 to notify the vehicle system 4 and/or the management device 220 about the abnormality. The vehicle system 4 can take measures such as prohibiting vehicle traveling accordingly.

The center apparatus 3 does not carry out the available update check at D7 when the vehicle information uploaded from the vehicle is determined to be not approved at D6. Therefore, it is possible to prevent the OTA software update from being performed in the non-approved vehicle. Even if the update due to new programs does not include update for the non-approved ECU 19, the center apparatus 3 does not perform the available update check at D7. This is because when the vehicle system 4 performs the software update based on the distributed update data, the vehicle system 4 may control not only the ECU updated with the distributed updated data but also another ECU that is not updated with the distributed updated data. In this regard, if the vehicle includes the non-approved ECU, there is a possibility that the software update may not normally completed. In view of this, the center apparatus 3 prohibits the OTA software update.

The center apparatus 3 includes the campaign DB 217 which contains the campaign information for the center apparatus 3 to notify the vehicle that the update due to a new program is available. The center apparatus 3 checks whether the update exists for the vehicle that is determined to be approved. When the update is determined to exist for that vehicle, the center apparatus 3 sends the campaign information to the vehicle system 4 and/or the portable terminal 6. This prompts the application program update. The center apparatus 3 can quickly notify the approved vehicle about the available update by, upon receiving the vehicle information from the vehicle, performing a series of processes including configuration information synchronization, determination of whether the received vehicle information matches the approved configuration, and the available update check.

The above vehicle program rewriting system 1 is modifiable and/or extendable in various ways including the following ways.

The center apparatus 3 may send a synchronization start request to the vehicle system 4. Upon receiving the synchronization start request, the DCM 12 may send the configuration information collection request to the CGW 13. For example, when the configuration information DB 208 is updated for the vehicle model=aaa, the center apparatus 3 sends the synchronization start request to the vehicles belonging the vehicle model=aaa.

The vehicle system 4 may send the hash value to the center apparatus 3 at the timing when the rewriting to all of the update target ECU(s) 19 based on the update data is completed. Specifically, when the rewriting to all of the update target ECU(s) 19 based on the update data is completed, the flowchart shown in FIG. 22A may be started from D1.

When the vehicle generated hash value and the verification hash value match each other at D2 also, the center apparatus 3 may request the vehicle system 4 to send the whole configuration information including a list of ECU SWIDs of the respective ECUs 19. Then, upon receiving the whole configuration information, the center apparatus 3 may perform D6 to D13.

When the vehicle generated hash value and the verification hash value match each other at D2, the center apparatus 3 may access the campaign DB 217 to determine whether the campaign information exists for the corresponding vehicle.

Figure 23B:
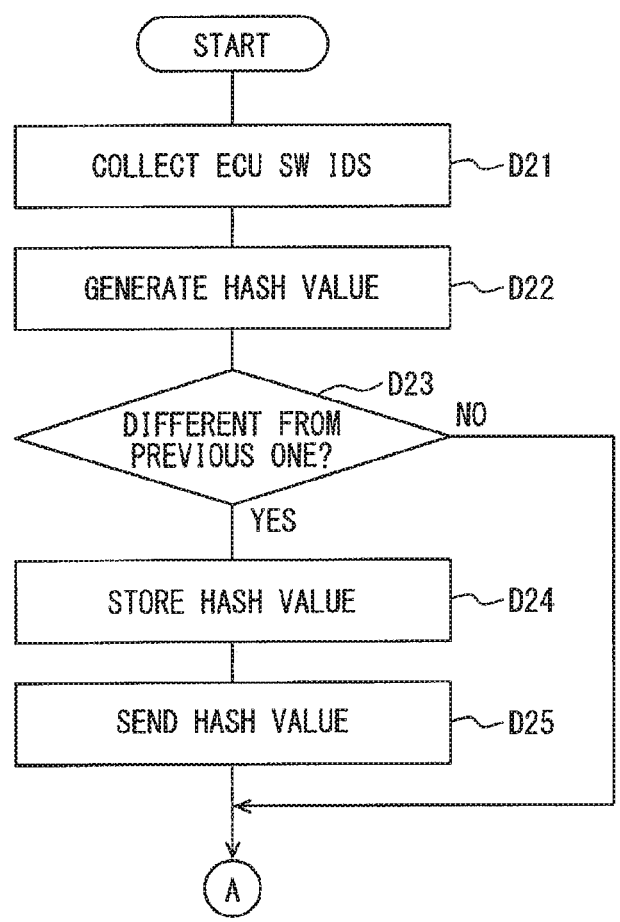
FIG. 23B is a flowchart illustrating processes for a vehicle system to send a hash value to a center apparatus.

A manner for sending the hash value from the vehicle system 4 to the center apparatus 3 may be that shown in FIG. 23B. FIG. 23B is a flowchart illustrating processing performed by the CGW 13.

For example, when the IG switch 37 is turned on, the CGW 13 collects the vehicle information including the ECU SWIDs from the respective ECUs 19 (D21), and generates a hash value based on data values of the collected vehicle information (D22). Then, at D23, the CGW 13 determines whether the hash value generated at D22 matches a previously generated hash value which was generated at a previous time and which is stored in the flash memory 24d. When these two hash values are different from each other, corresponding to YES at D23, the CGW 13 stores the hash value generated this time in the flash memory 24d (D24) and sends the hash value generated this time to the center apparatus 3 (D25). When the hash value generated this time and the hash value generated previous time do not differ from each other, corresponding to NO at D23, the processing in FIG. 23B is ended. It is assumed that the hash value of the vehicle information at the production or sale of the vehicle is pre-stored in advance in the flash memory 24d. The manner illustrated in FIG. 23B may reduce the number of times the vehicle system 4 uploads the hash value to the center apparatus 3.

Next, with reference to FIG. 25 to FIG. 26, processes performed by the campaign management section 3D for causing the vehicle system 4 to perform application program update at an improved rate will be described.

Figure 24:
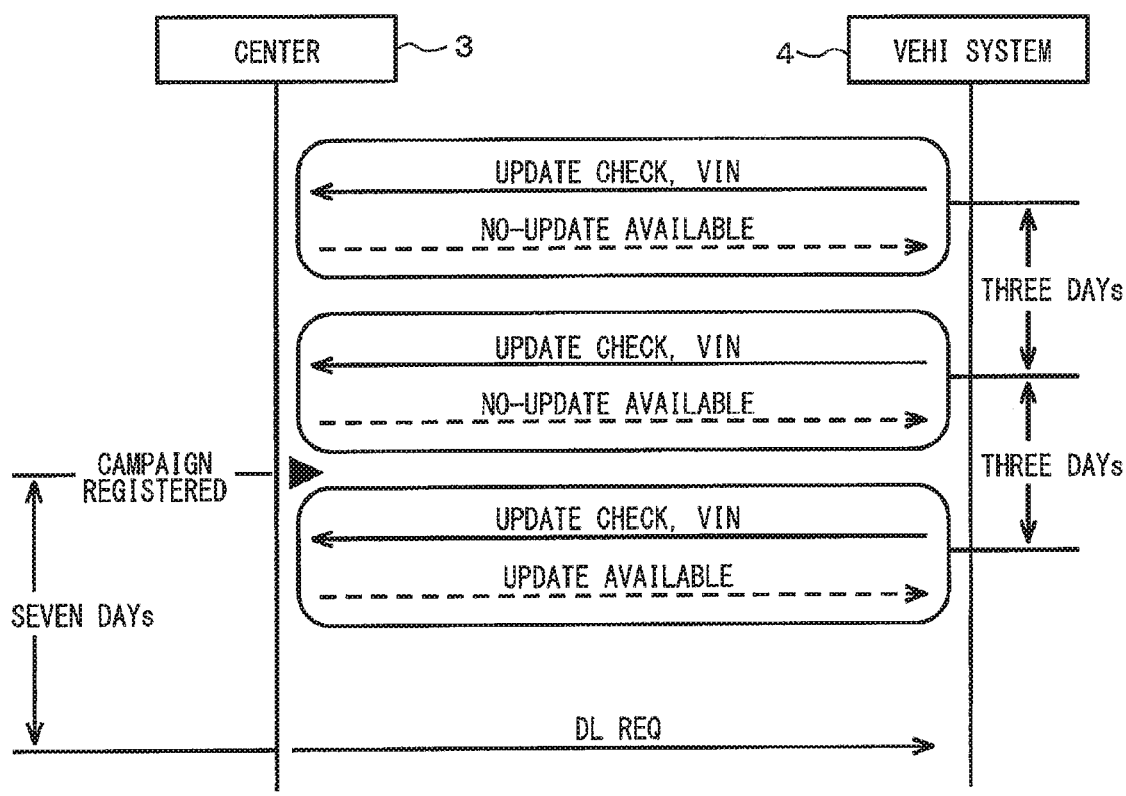
FIG. 24 is a sequence diagram illustrating update check processing performed by a center apparatus and a vehicle system interactively.

Based on a setting made by a user, the vehicle system 4 periodically inquires the center apparatus 3 about the presence or absence of the available update at user-set intervals of, for example, 3 days. For example, as shown in FIG. 24, the user may set a HTTP polling interval to 3 days by manipulating a configuration file in the vehicle system 4. When the campaign information for the vehicle, e.g., for the VIN, is registered in the campaign DB 217 and thereafter the available update for the vehicle is checked by the center computer 310, the center apparatus 3 notifies the vehicle that the update is available, Specially, the above descried available update check at D7 is performed at time when the IG switch is turned on after the elapse of 3 days since the previous turn on of the IG switch.

When the center apparatus 3 is configured to perform the available update check in response to the inquiry from the vehicle, the center apparatus 3 is not required to send, at time of the registration of the campaign information, the campaign information to all of the vehicles relevant to this campaign.

In the above illustrated example shown in FIG. 24, when the user does not use the vehicle for a long period time, the available update inquiry using the HTTP is not performed for this time period. Thus, it is conceivable in some vehicles that the application program update is not performed and the users of vehicles do not know the new campaign.

Figure 25:
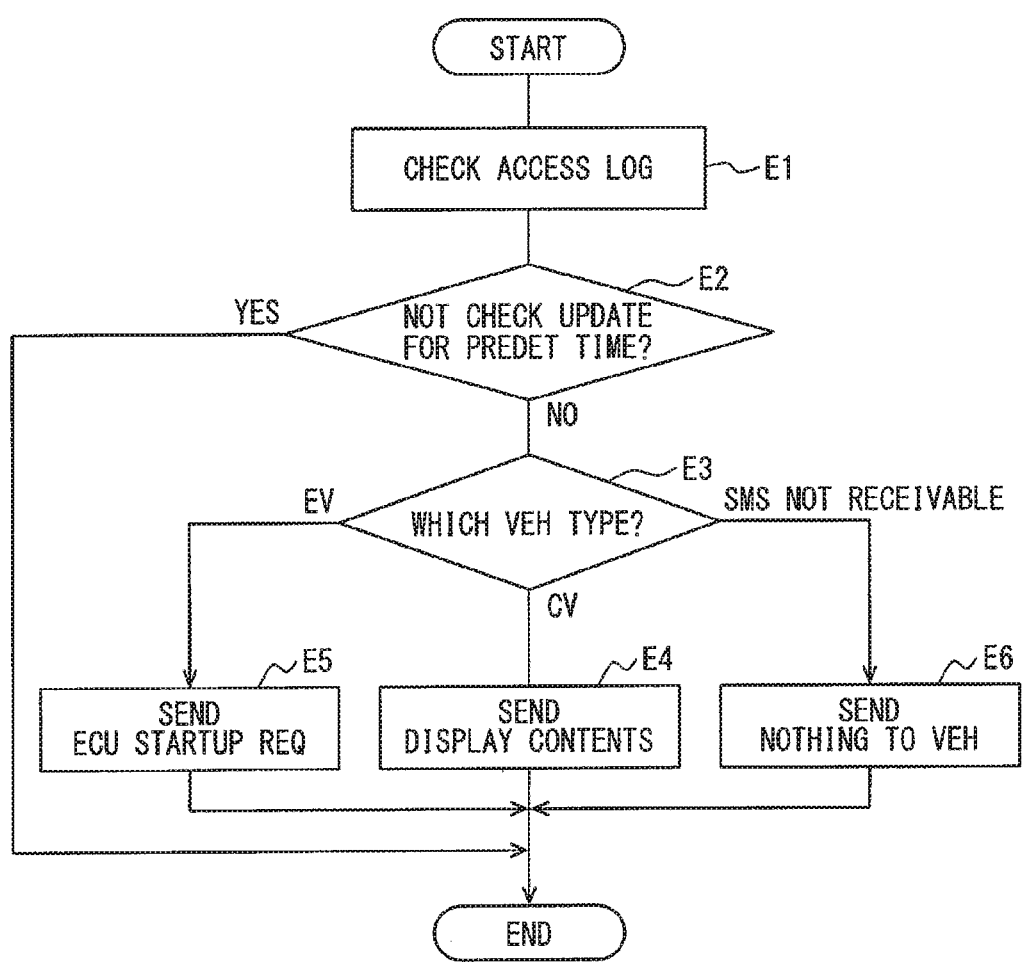
FIG. 25 is a flowchart illustrating processes performed by a center apparatus.

In view of the above, the SMS sending control unit 212 of the center apparatus 3 may be configured to perform the processing illustrated in FIG. 25. At E1, the center apparatus 3 accesses the individual vehicle information DB 213 to check the access log of each individual vehicle periodically or at a predetermined timing. At E2, the center apparatus 3 determines for each individual vehicle whether the vehicle has not sent the vehicle information to the center apparatus 3 to check the available update for the predetermined time period. The predetermined time period is, for example, about seven days since a new campaign was registered in the campaign DB 217. Specifically, the SMS sending control unit 212 compares the vehicle SWIDs of the vehicles in the individual configuration information DB with the before-update vehicle SWID in the campaign DB 217 to identify the vehicles which has not performed the update corresponding to the campaign and specifies, based on the access logs of the identified vehicles, the vehicle that has not sent the update check inquiry to the center apparatus 3. That the SMS sending control unit 212 may specify the vehicle that has not sent the update check inquiry to the center apparatus 3.

In the individual vehicle configuration information DB 213, initial data may be registered by the OEM at time of production of vehicles in a factory. An entry into the access log for the first time since the registration of the initial data is made when, the OEM or the like notifies that the vehicle is purchased. This first entry into the access log validates the OTA program updates. The determination at E2 is not made for the vehicles associated with the access logs that have not the first entry.

When the SMS sending control unit 212 specifies the vehicle that has not sent the update check inquiry to the center apparatus 3 (NO at E2), the SMS sending control unit 212 identifies type of the vehicle based on its vehicle model and equipment information in the individual vehicle configuration information DB213 (E3), The type includes: a SMS receivable electric vehicle (EV); a SMS receivable conventional vehicle (CV); and a SMS un-receivable vehicle. For example, when the DCM 12 of the vehicle does not have a SMS receiving function, this vehicle is determined to be the SMS un-receivable vehicle. When there is no SMS reception agreement, this vehicle is determined to be the SMS un-receivable vehicle. In the above, the CV may include a gasoline engine vehicle.

In the case of the EV, the SMS sending control unit 212 sends a SMS to the vehicle to command the vehicle system 4 to perform a sequence including starting up the ECUs 19 and send the vehicle information to the center apparatus 3 (E3), When the DCM 12 receives the SMS and executes the commands in the SMS, the IG-on state is established and the CGW 13 starts up. Then the CGW 13 sends the vehicle information to the center apparatus 3 via the DCM 12. Thereafter, the center apparatus 3 performs the available update check as shown in FIG. 22A and the vehicle system 4 downloads the distribution package. In the case of EV, since the battery capacity is large, it may be possible to place the parked state EV into the IG power state to download the program. Therefore, the SMS sending control unit 212 uses the SMS for the vehicle system 4 to start up the ECUs 19 and to automatically perform the available update inquiry, the download and subsequent processes.

The vehicle system 4 refers to the rewriting specification data shown in FIG. 17 and does not start the installation if the battery level is lower than the battery level threshold specified in the rewriting specification data. Alternatively, the vehicle system 4 may refer to the battery level threshold described as the restriction in the campaign file sent at D9 and may not start the download of the distribution package if the battery level is lower than the battery level threshold specified in the campaign file.

Figure 26:
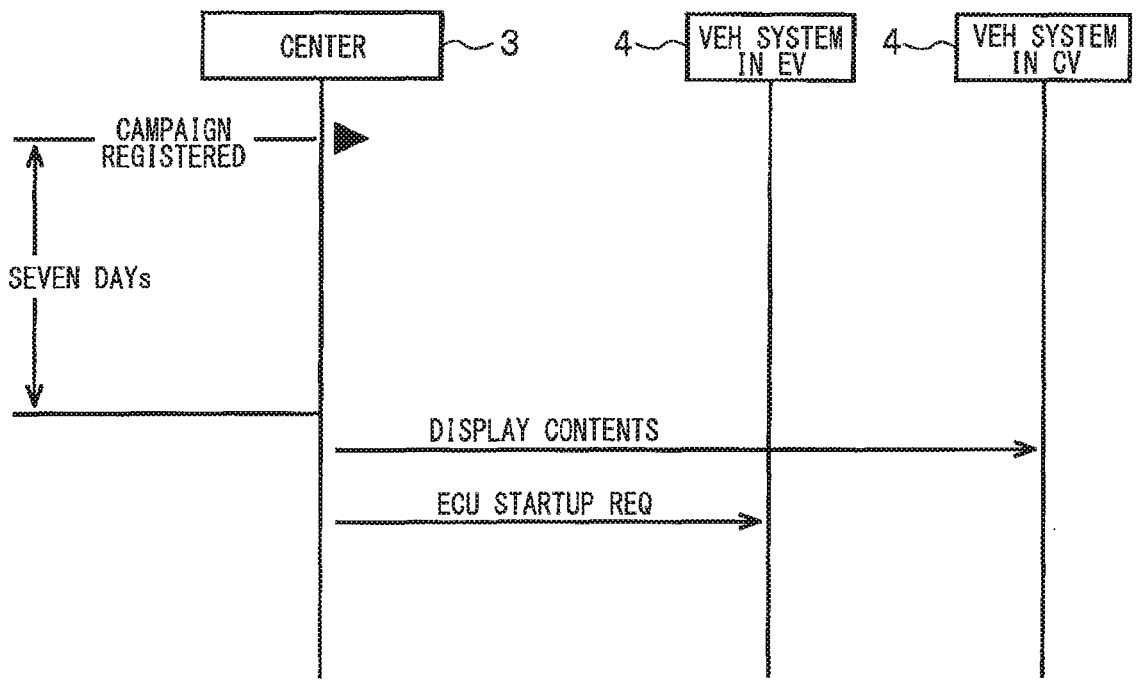
FIG. 26 is a sequence diagram illustrating a center apparatus sending messages to an electric vehicle (EV) and a conventional vehicle (CV)

In the case of the CV, the SMS sending control unit 212 sends an SMS including display contents for the in-vehicle display 7 to the vehicle in which the SMS is receivable due to the DCM 12 having an intermittent in-operation state (see E4 of FIG. 25 as well as FIG. 26). For example, when the IG switch is turned on, the CGW 13 instructs the in-vehicle display 7 to display the texts described in the received SMS. Additionally or alternatively, when the portable terminal 6 of the user is registered in the individual vehicle information DB 213, the SMS may be sent to the portable terminal 6. For example, based on the received SMS, the portable terminal 6 displays messages indicating that there is campaign information, please turn on IG. The individual vehicle information DB 213 is an example of user information storage. In the case of the SMS un-receivable vehicle, nothing is done to the vehicle (E6). In this case, the campaign may be notified to the user via land-mail or the like.

In the above processing, the vehicle system 4 sends the vehicle information including the data of the respective ECUs 19 to the center apparatus 3, and the center apparatus 3 stores 3 the received vehicle information in the individual vehicle information DB 213 together with its sending date and time in association with the respective vehicle. For each individual campaign, the campaign DB 217 contains the campaign ID and the list of VINs that identify the vehicles available to the data update. Then, the center apparatus 3 accesses the individual vehicle information DB 213 to identify the vehicle that is included in the VIN list of the campaign DB 217 and that has not sent the vehicle information for the predetermined time period since the sending date and time stored in the individual vehicle information DB 213. To the vehicle system 4 of the identified vehicle, the center apparatus 3 sends a message to prompt the data update by SMS.

Accordingly, even if the vehicle information is not sent to the center apparatus 3 for a long time period because of no opportunity for the user to get on the vehicle, the center apparatus 3 sends a message to the vehicle system 4 to prompt the data update upon the elapse of the predetermined time period since the sending date and time of the previous vehicle information sending stored in the individual vehicle information DB 213. Therefore, with the message, the user can recognize that data update is required.

The center apparatus 3 determines the vehicles available to the program update by referring to the individual vehicle information DB 213 and campaign DB 217. In association with a respective VIN of each individual vehicle, the individual vehicle information DB 213 contains the date and time when the vehicle information was sent from the vehicle. The campaign DB 217 contains the list of VINs available to the program update. Therefore, the center apparatus 3 can determine the vehicles target for the program update, based on the list of VINs and the vehicle information sending date and time.

In response the turn on of the IG switch 37, the vehicle system 4 collects the vehicle information from the ECUs 19 and sends the vehicle information to the center apparatus 3. Thus, when the user gets in the vehicle, the vehicle information can be surely sent to the center apparatus 3.

If the vehicle available to the program update is EV, the center apparatus 3 may send a message to the EV to instruct the EV to start up the ECUs and perform processing relating to the data update. In this case, the EV can perform the processing relating to the data update without waiting for user's instructions because the EV typically has a large capacity battery. This manner enables efficient data update.

If the vehicle available to the program update is CV, the center apparatus 3 sends messages including texts displayable on the in-vehicle display 7 to the CV. Therefore, by referring to the texts displayed on the in-vehicle display 7, the user can recognize that the data update is necessary.

When the destination address of the portable terminal 6 of the user is stored in the individual vehicle information DB 213, the center apparatus 3 sends a message including texts displayable on the portable terminal 6 to the portable terminal 6. This enables the use to recognize that the data update is necessary by checking the texts displayed on the portable terminal 6 even if there is no opportunity to get on the vehicle.

To the center apparatus 3, the user may send his desired date and destination of campaign notification. This may be done with the portable terminal 6. In this case, the center apparatus 3 registers the user desired date and destination in the individual vehicle information DB 213. For example, the user may designate the next day of campaign issuance date as the desired date of campaign notification and the portable terminal 6 as the destination of campaign notification instead of the in-vehicle display 7.

As the destination and desired date of campaign notification, the user may designate the vehicle and a certain date and time when a user will not get on the vehicle. Further, the user may approve an automatic program update. In these cases, the center apparatus 3 sends the campaign information to the registered destination on the registered date, regardless of the vehicle information sending. The user who will not get on the vehicle for a while can receive the campaign information on the date designated by him or her.

In the above, the user information storage may be provided separately from the individual vehicle information DB 213. The campaign information may be sent by other than SMS.

Figure 27:
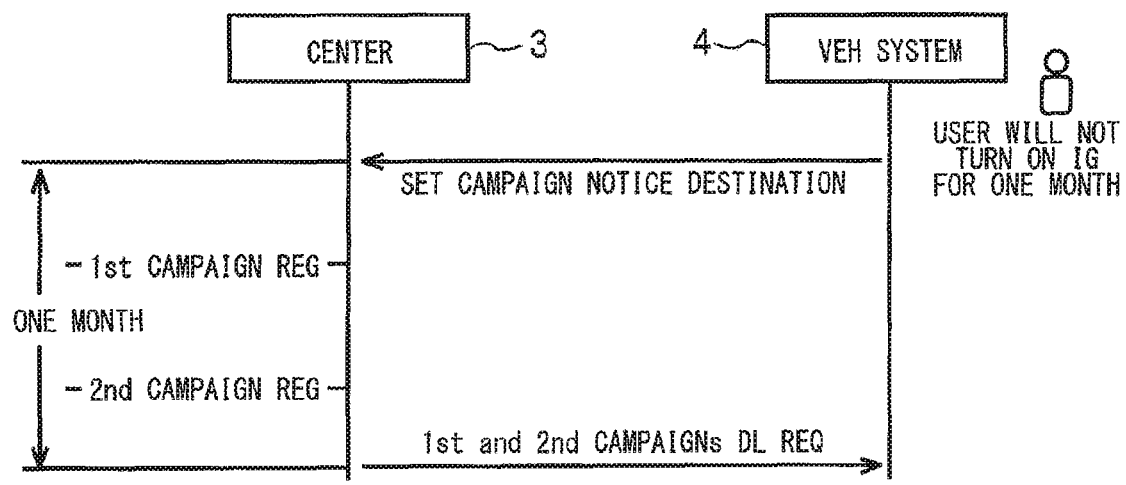
FIG. 27 is a sequence diagram illustrating processes performed by a center apparatus and a vehicle system.

Next, description will be given as to another case where the user designates a notification manner of the campaign information and the massage. For example, it is assumed that the user will not get on the vehicle and will not turn on the IG switch for about one month. As shown in FIG. 27, with the portable terminal 6, the user may send his setting of the campaign notification destination and the campaign notification date and time to the center apparatus 3, For example, the user setting may request that the campaign information should be sent to the portable terminal 6 one month later. The individual vehicle information management unit 3C accordingly stores the notification destination and the notification date and time in the individual vehicle information DB 213, and notifies the user according to the setting. For example, if first and second campaigns are registered during that one month, the SMS sending control unit 212 sends the first campaign information and the second campaign information to the user's portable terminal 6 at a time corresponding to the one month, thereby prompting the user to perform processes for the program update.

In the manner, when the user sends the campaign information notification notification destination and the notification date to the center apparatus 3 via the portable terminal 6, the center apparatus 3 stores the received notification destination and notification date in the individual vehicle information DB 213. Then, the center apparatus 3 sends the campaign information to the notification destination on the stored notification date. Accordingly, when the user will not get on the vehicle for a certain time period, it is possible to stop the center apparatus 3 from sending unnecessary campaign information.

<Description of Center Apparatus>

The following describes the center apparatus 3 disclosed in the present disclosure in various aspects.

First Aspect

In a first aspect of the present disclosure, a center apparatus for use in an vehicle information communication system comprises a center computer configured to communicate with a vehicle apparatus mounted in a vehicle via wireless communications, the vehicle apparatus including: a plurality of ECUs each having installed software and each associated with a respective ECU software identifier (SWID) which is changed together at least with change in the installed software; and a vehicle computer coupled to the plurality of ECUs and configured to perform ECU software update. The center apparatus further includes: an approved-configuration database (DB) that contains a plurality of approved ECU SWID combinations in association with of a plurality of vehicle models; and an update DB that contains ECU software update data. The center computer is configured to: receive the ECU SWIDs of the plurality of ECUs from the vehicle apparatus via the wireless communications; perform a first determination of whether all of the ECU SWIDs received from the vehicle apparatus are included in a particular ECU SWID combinations among the plurality of ECU SWID combinations registered in the approved-configuration DB, the particular ECU SAID combination corresponding to the vehicle model of the vehicle; perform a second determination of whether software update data exists in the update DB for at least one of the plurality of ECUs of the vehicle; and when both the first and second determinations are true, send the software update data to the vehicle apparatus via the wireless communications.

Second Aspect

In a second aspect of the present disclosure, the center computer is further configured to, upon determining that the particular ECU SWID combination that includes all of the ECU SWIDs received from the vehicle apparatus does not exist in the approved-configuration DB, send a message to the vehicle apparatus to indicate that Over-The-Air (OTA) software update is prohibited for all of the plurality of ECUs mounted in the vehicle due to the vehicle having a non-approved ECU SWID combination.

Third Aspect

In a third aspect of the present disclosure, the center computer is further configured to, upon determining that the particular ECU SWID combination that includes all of the ECU SWIDs received from the vehicle apparatus does not exist in the approved-configuration DB, notify the vehicle apparatus about abnormality.

Fourth Aspect

In a fourth aspect of the present disclosure, the center computer is further configured to communicate with a management device managed by an Original Equipment Manufacturer (OEM) of the vehicle. The center computer is further configured to, upon determining that the particular ECU SWID combination that includes all of the ECU SWIDs received from the vehicle apparatus does not exist in the approved-configuration DB, notify the management device about the abnormality.

Fifth Aspect

In a fifth aspect of the present disclosure, the center computer is further configured to, when both the first and second determinations are true and prior to sending the software update data to the vehicle apparatus: notify at least one of the vehicle apparatus or a user portable terminal that a software update is available; and after receiving an update approval from the vehicle apparatus or the user portable device, send the software update data to the vehicle apparatus via the wireless communications.

Sixth Aspect

In a sixth aspect of the present disclosure, the center computer is further configured to, when the first determination is true and the second determination is false, notify the vehicle apparatus that no software update is available.

Seventh Aspect

In a sixth aspect of the present disclosure, the ECU SWIDs of the plurality of ECUs received from the vehicle apparatus includes: the ECU SWID of a first ECU configured to receive the software update data via the wireless communications from the center apparatus; and the ECU SWID of a second ECU configured to receive software update data via wired communications from an outside of the vehicle.

Eighth Aspect

In an eighth aspect of the present disclosure, the center apparatus further includes an individual vehicle information DB that contains a plurality of vehicle information entries each associated with a unique vehicle identifier, each vehicle information entry including the ECU SWIDs of a corresponding vehicle, the individual vehicle information DB being updated when the center computer receives the ECU SWIDs from the vehicle. The center computer is further configured to receive a hash value from the vehicle apparatus via the wireless communications, wherein the hash value is generated by the vehicle computer based at least on the ECU SWIDs of the plurality of ECUs and sent to the center apparatus via the wireless communications. The center computer is further configured to: upon receiving the hash value from the vehicle apparatus, determine whether the received hash value matches a verification hash value, the verification hash value being generated based on at least the ECU SWIDs included in the vehicle information entry stored in the individual vehicle information DB that matches the unique vehicle identifier of the vehicle; and when the received hash does not match the verification hash value, request the vehicle apparatus to send the ECU SWIDs of the plurality of ECUs to the center apparatus.

Ninth Aspect

In a ninth aspect of the present disclosure, the center computer is configured to update the individual vehicle information DB based on the ECU SWIDs that are sent from the vehicle apparatus computer in response to the sending request.

Tenth Aspect

In a tenth aspect of the present disclosure, the center computer is further configured to, when the hash value received from the vehicle matches the verification hash value, perform the first determination based on the ECU SWIDs which were received from the vehicle apparatus at a previous time and subsequently stored within the vehicle information entry in the individual vehicle information DB that matches the unique vehicle identifier of the vehicle.

Eleventh Aspect

In an eleventh aspect of the present disclosure, the center computer is further configured to: determine whether the vehicle is in an update suitable state, based on at least one of a trouble code indicating ECU abnormality or license information indicating an Over-The-Air (OTA) update license agreement; and notify the vehicle apparatus that a software update is available, on condition that the vehicle is determined to be in the update suitable state.

Twelfth Aspect

In a twelfth aspect of the present disclosure, the center computer is further configured to: receive the trouble code indicating ECU abnormality from the vehicle apparatus together with the generated hash value; and determine that the vehicle is in the update suitable state when the trouble code does not indicate ECU abnormality in any of the ECUs for which the software update data exists in the update DB.

Thirteenth Aspect

In a thirteenth aspect of the present disclosure, the center computer is further configured to: receive the trouble code indicating ECU abnormality from the vehicle apparatus together with the generated hash value; and determine that the vehicle is not in the update suitable state when the trouble code indicates ECU abnormality in any of the plurality of ECUs.

Fourteenth Aspect

In a fourteenth aspect of the present disclosure, the center computer is further configured to: receive the license information from the vehicle apparatus together with the generated hash value; perform a third determination of whether the OTA update license agreement indicated by the received license information is valid; and notify the vehicle apparatus that a software update is available when the first, second, and third determinations are all true.

Fifteenth Aspect

In a fifteenth aspect of the present disclosure, the center computer is further configured to receive the hash value that the vehicle computer sends to the center apparatus upon an ignition switch of the vehicle being turned on or off.

Sixteenth Aspect

In a sixteenth aspect of the present disclosure, the center computer is further configured to receive the hash value that the vehicle computer generates and sends to the center apparatus upon completion of the ECU software update based on the software update data.

Seventeenth Aspect

In a seventeenth aspect of the present disclosure, when the center computer determines that the hash value received from the vehicle does not match the verification hash value, the center computer performs the second determination of whether the software update data exists in the update DB for at least one of the plurality of ECUs of the vehicle.

Eighteenth Aspect

In a eighteenth aspect of the present disclosure, when the center computer determines that the hash value received from the vehicle apparatus matches the verification hash value, the center computer performs the second determination of whether the software update data exists in the update DB for at least one of the plurality of ECUs of the vehicle.

Nineteenth Aspect

In a nineteenth aspect of the present disclosure, the center computer is configured to receive the hash value from the vehicle apparatus that includes the vehicle computer configured to: determine whether the generated hash value matches a previously generated hash value which was generated at a previous time; and perform the sending of the generated hash value to the center computer upon determining that the generated hash value does not match the previously generated hash value.

The present disclosure includes a method performed by the center apparatus in a respective one of the above aspects. The present disclosure includes a program stored in a non-transitory computer readable storage medium to cause a center computer to perform processes corresponding to respective one of the above aspects.

Although the present disclosure has been described in accordance with embodiments, it is understood that the present disclosure is not limited to the embodiments and the structures illustrated. The present disclosure encompasses various modifications and variations within the scope of equivalents. In addition, various combinations and configurations, as well as other combinations and configurations, including only one element, more, or less, fall within the scope and spirit of the present disclosure.

What is claimed is:

1. A vehicle information communication system comprising:
    a vehicle apparatus mounted in a vehicle, and including a group of electronic control units (ECUs) and a vehicle computer; and
    a center apparatus including:
        an approved-configuration database (DB) that includes approved-configuration information which contains approved ECU-group configurations for the group of ECUs mounted in the vehicle,
        an update DB that contains software update data for the group of ECUs mounted in the vehicle, and
        a center computer configured to communicate with the vehicle apparatus via wireless communications,
    wherein:
    the vehicle computer is configured to send vehicle configuration information which includes configuration information on the group of ECUs mounted in the vehicle to the center apparatus via the wireless communications,
    the center computer is configured to:
        perform a first determination of whether the vehicle configuration information received from the vehicle apparatus matches the approved-configuration information registered in the approved-configuration DB;
        perform a second determination of whether software update data for at least one ECU of the group of ECUs mounted in the vehicle exists in the update DB; and
        when both the first and second determinations are true, send the software update data for at least one ECU of the group of ECUs mounted in the vehicle to the vehicle apparatus via the wireless communications; and
    the vehicle computer is further configured to:
        based on the software update data for at least one ECU of the group of ECUs mounted in the vehicle received from the center apparatus, perform a software update for at least one ECU of the group of ECUs mounted in the vehicle; and in response to completion of the software update for at least one ECU of the group of ECUs mounted in the vehicle, perform processing to send new vehicle configuration information including the configuration information on the group of ECUs mounted in the vehicle to the center apparatus;

wherein:

when the sending of the new vehicle configuration information including the configuration information on the group of ECUs mounted in the vehicle to the center apparatus is performed by the vehicle computer in response to the completion of the software update for at least one ECU of the group of ECUs mounted in the vehicle, the center computer:
  (i) performs the first determination using the new vehicle configuration information including the configuration information on the group of ECUs mounted in the vehicle;
  (ii) notifies the vehicle apparatus about an abnormality for the new vehicle configuration information including the configuration information on the group of ECUs mounted in the vehicle when the first determination using the new vehicle configuration information including the configuration information on the group of ECUs mounted in the vehicle is false; and
  (iii) sends further software update data to the vehicle apparatus via the wireless communications when both of the first determination using the new vehicle configuration information including the configuration information on the group of ECUs mounted in the vehicle and the second determination performed after receipt of the new vehicle configuration information including the configuration information on the group of ECUs mounted in the vehicle are true.

2. A center apparatus for providing software update data via wireless communications to a vehicle apparatus mounted in a vehicle that includes a group of electronic control units (ECUs) and a vehicle computer configured to send vehicle configuration information which includes configuration information on the group of ECUs mounted in the vehicle to the center apparatus via the wireless communications, the center apparatus comprising:

an approved-configuration database (DB) that includes approved-configuration information which contains approved ECU-group configurations for the group of ECUs mounted in the vehicle;

an update DB that contains software update data for the group of ECUs mounted in the vehicle; and a center computer configured to:
  perform a first determination of whether the vehicle configuration information received from the vehicle apparatus matches the approved-configuration information registered in the approved-configuration DB;
  perform a second determination of whether software update data for at least one ECU of the group of ECUs mounted in the vehicle exists in the update DB; and
  when both the first and second determinations are true, send the software update data for at least one ECU of the group of ECUs mounted in the vehicle to the vehicle apparatus via the wireless communications, which causes the vehicle computer to,
    based on the software update data for at least one ECU of the group of ECUs mounted in the vehicle received from the center apparatus, perform a software update for at least one ECU of the group of ECUs mounted in the vehicle,
    wherein in response to completion of the software update for at least one ECU of the group of ECUs mounted in the vehicle, the vehicle computer performs processing to send new vehicle configuration information including the configuration information on the group of ECUs mounted in the vehicle to the center apparatus, wherein:

when the sending of the new vehicle configuration information including the configuration information on the group of ECUs mounted in the vehicle to the center apparatus is performed by the vehicle computer in response to the completion of the software update for at least one ECU of the group of ECUs mounted in the vehicle, the center computer:
  (j) performs the first determination using the new vehicle configuration information including the configuration information on the group of ECUs mounted in the vehicle;
  (ii) notifies the vehicle apparatus about an abnormality for the new vehicle configuration information including the configuration information on the group of ECUs mounted in the vehicle when the first determination using the new vehicle configuration information including the configuration information on the group of ECUs mounted in the vehicle is false; and
  (iii) sends further software update data to the vehicle apparatus via the wireless communications when both of the first determination using the new vehicle configuration information including the configuration information on the group of ECUs mounted in the vehicle and the second determination performed after receipt of the new vehicle configuration information including the configuration information on the group of ECUs mounted in the vehicle are true.

3. The center apparatus according to claim 2, wherein:
the group of ECUs mounted in the vehicle includes a plurality of groups of ECUs mounted in the vehicle;
the approved ECU-group configurations for the group of ECUs mounted in the vehicle registered in the approved-configuration DB include a plurality of approved ECU-group configurations for the plurality of groups of ECUs mounted in the vehicle;
the software update data in the update DB includes software update data for each group of ECUs of the plurality of groups of ECUs mounted in the vehicle; and
both the first and second determinations are performed for each group of ECUs of the plurality of groups of ECUs mounted in the vehicle.

4. The center apparatus according to claim 2, wherein:
a respective ECU in the group of ECUs mounted in the vehicle has installed software and is associated with an ECU configuration identifier (CFG-ID) which is changed together at least with a change in the installed software;
the approved ECU-group configurations for the group of ECUs mounted in the vehicle registered in the approved-configuration DB include approved ECU CFG-ID combinations for the group of ECUs mounted in the vehicle;
the configuration information on the group of ECUs in the vehicle configuration information sent from the vehicle apparatus to the center apparatus includes the ECU CFG-IDs of the group of ECUs mounted in the vehicle; and the center computer performs the first determination through determining whether the ECU CFG-IDs of the group of ECUs in the vehicle configuration information received from the vehicle apparatus match any of the approved ECU CFG-ID combinations for the group of ECUs mounted in the vehicle registered in the approved-configuration DB.

5. The center apparatus according to claim 4, wherein:
a respective ECU CFG-ID, which is changed together at least with the change in the installed software, differs according to ECU hardware configuration.

6. The center apparatus according to claim 4, wherein:
a respective ECU CFG-ID includes (i) a first part which is changed together with the change in the installed software and (ii) a second part which differs according to ECU hardware configuration.

7. The center apparatus according to claim 2, wherein:
the center computer is further configured to, when both the first and second determinations are true and prior to sending the software update data for at least one ECU of the group of ECUs mounted in the vehicle to the vehicle apparatus via the wireless communications,
notify at least one of the vehicle apparatus or a user portable terminal device about ECU software update available, and
after receiving an approval from at least one of the vehicle apparatus or the user portable terminal device, send the software update data for at least one ECU of the group of ECUs mounted in the vehicle to the vehicle apparatus via the wireless communications.

8. The center apparatus according to claim 2, wherein:
the center computer is further configured to, when the first determination is true and the second determination is false, notify the vehicle apparatus about ECU software update unavailable.

9. The center apparatus according to claim 2, wherein:
the center apparatus further includes:
an individual vehicle information DB that contains a plurality of vehicle information entries each associated with a unique vehicle identifier of the vehicle, each vehicle information entry including the configuration information on the group of ECUs mounted in the vehicle, the individual vehicle information DB being updated when the center apparatus receives from the vehicle apparatus the vehicle configuration information including the configuration information on the group of ECUs mounted in the vehicle.

10. The center apparatus according to claim 9, wherein:
the vehicle computer is further configured to generate a digest value based at least on the configuration information on the group of ECUs mounted in the vehicle and send the generated digest value to the center apparatus via the wireless communications; and
the center computer is further configured to:
upon receiving the generated digest value from the vehicle apparatus, determine whether the received digest value matches a verification digest value, the verification digest value being generated based at least on the configuration information of a corresponding vehicle included in the vehicle information entry stored in the individual vehicle information DB that matches the unique vehicle identifier of the vehicle; and when the received digest value does not match the verification digest value, request the vehicle apparatus to send the vehicle configuration information including the configuration information on the group of ECUs mounted in the vehicle to the center apparatus.

11. The center apparatus according to claim 10, wherein:
the vehicle computer is further configured to perform the sending of the vehicle configuration information including the configuration information on the group of ECUs mounted in the vehicle to the center apparatus via the wireless communications in response to receiving the sending request from the center apparatus; and
the center computer is further configured to update the individual vehicle information DB based on the vehicle configuration information including the configuration information on the group of ECUs mounted in the vehicle received from the vehicle apparatus.

12. The center apparatus according to claim 10, wherein:
the center computer is further configured to, when the received digest value matches the verification digest value, perform the first determination based on the vehicle configuration information including the configuration information on the group of ECUs mounted in the vehicle which was received from the vehicle apparatus at a previous time and subsequently stored within the vehicle information entry in the individual vehicle information DB that matches the unique vehicle identifier of the vehicle.

13. The center apparatus according to claim 11, wherein:
the vehicle computer determines whether the generated digest value matches a previously generated digest value which was generated at a previous time, and
the center computer receives the digest value that is sent from the vehicle computer upon the vehicle computer determining that the generated digest value does not match the previously generated digest value.

14. The center apparatus according to claim 10, wherein:
the center computer receives the digest value that is generated by the vehicle computer and that is sent from the vehicle computer upon an ignition switch of the vehicle being turned on or off.

15. The center apparatus according to claim 10, wherein:
the center computer receives the digest value that is generated and sent from the vehicle computer upon the vehicle computer completing the software update for at least one ECU of the group of ECUs mounted in the vehicle based on the software update data for at least one ECU of the group of ECUs mounted in the vehicle.

16. The center apparatus according to claim 10, wherein:
when the center computer determines that the received digest value does not match the verification digest value, the center computer performs the second determination of whether the software update data for at least one ECU of the group of ECUs mounted in the vehicle exists in the update DB.

17. The center apparatus according to claim 16, wherein:
when the center computer determines that the received digest value matches the verification digest value, the center computer performs the second determination of whether the software update data for at least one ECU of the group of ECUs mounted in the vehicle exists in the update DB.

18. The center apparatus according to claim 2, wherein:
the center computer is further configured to:
determine whether the vehicle is in an update suitable state, based on at least one of a trouble code indicating an ECU abnormality or license information indicating an Over-The-Air (OTA) update license agreement, and notify the vehicle apparatus about ECU software update available, on condition that the vehicle is determined to be in the update suitable state.

19. The center apparatus according to claim 18, wherein:
the vehicle computer is further configured to send the trouble code indicating an ECU abnormality to the center apparatus; and
the center computer is further configured to determine that the vehicle is in the update suitable state when the trouble code does not indicate an ECU abnormality in any ECU of the group of ECUs mounted in the vehicle for which the software update data for at least one ECU of the group of ECUs mounted in the vehicle exists in the update DB.

20. The center apparatus according to claim 18, wherein:
the vehicle computer is further configured to send the trouble code indicating an ECU abnormality to the center apparatus; and
the center computer is further configured to determine that the vehicle is not in the update suitable state when the trouble code indicates an ECU abnormality in any ECU of the group of ECUs mounted in the vehicle.

21. The center apparatus according to claim 18, wherein:
the vehicle apparatus further includes a memory having stored thereon the license information indicating the OTA update license agreement;
the vehicle computer is further configured to send the license information indicating the OTA update license agreement to the center apparatus; and
the center computer is further configured to:
perform a third determination of whether the OTA update license agreement indicated by the license information is valid, and
notify the vehicle apparatus about software update available when the first, second, and third determinations are all true.

22. A method for providing software update data via wireless communications to a vehicle apparatus mounted in a vehicle that includes a group of electronic control units (ECUs) and a vehicle computer configured to send vehicle configuration information which includes configuration information on the group of ECUs mounted in the vehicle to a center apparatus via wireless communications,
the center apparatus including (i) an approved-configuration database (DB) that includes approved-configuration information which contains approved ECU-group configurations for the group of ECUs mounted in the vehicle and (ii) an update DB that contains software update data for the group of ECUs mounted in the vehicle,
the method comprising:
performing a first determination of whether the vehicle configuration information received from the vehicle apparatus matches the approved-configuration information registered in the approved-configuration DB;
performing a second determination of whether software update data for at least one ECU of the group of ECUs mounted in the vehicle exists in the update DB; and
when both the first and second determinations are true, sending the software update data for at least one ECU of the group of ECUs mounted in the vehicle to the vehicle apparatus via the wireless communications, which causes the vehicle computer to,
based on the software update data for at least one ECU of the group of ECUs mounted in the vehicle received from the center apparatus, perform a software update for at least one ECU of the group of ECUs mounted in the vehicle,
wherein the vehicle computer is configured to, in response to completion of the software update for at least one ECU of the group of ECUs mounted in the vehicle, perform processing to send new vehicle configuration information including the configuration information on the group of ECUs mounted in the vehicle to the center apparatus; and
when the sending of the new vehicle configuration information including the configuration information on the group of ECUs mounted in the vehicle to the center apparatus is performed by the vehicle computer in response to the completion of the software update for at least one ECU of the group of ECUs mounted in the vehicle,
(A) performing the first determination using the new vehicle configuration information including the configuration information on the group of ECUs mounted in the vehicle,
(B) notifying the vehicle apparatus about an abnormality for the new vehicle configuration information including the configuration information on the group of ECUs mounted in the vehicle when the first determination using the new vehicle configuration information including the configuration information on the group of ECUs mounted in the vehicle is false, and
(C) sending further software update data to the vehicle apparatus via the wireless communications when both of the first determination using the new vehicle configuration information including the configuration information on the group of ECUs mounted in the vehicle and the second determination performed after receipt of the new vehicle configuration information including the configuration information on the group of ECUs mounted in the vehicle are true.

* * * * *